United States Patent
Ishihara

(10) Patent No.: US 9,299,151 B2
(45) Date of Patent: Mar. 29, 2016

(54) DEPTH CALCULATION DEVICE, IMAGING APPARATUS, AND DEPTH CALCULATION METHOD

(71) Applicant: CANON KABUSHIKI KAISHA, Tokyo (JP)

(72) Inventor: Keiichiro Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 14/446,414

(22) Filed: Jul. 30, 2014

(65) Prior Publication Data

US 2015/0043783 A1    Feb. 12, 2015

(30) Foreign Application Priority Data

Aug. 8, 2013 (JP) ................ 2013-165119

(51) Int. Cl.
    *G06K 9/00*    (2006.01)
    *G06T 7/00*    (2006.01)
(52) U.S. Cl.
    CPC ..... *G06T 7/0069* (2013.01); *G06T 2207/10148* (2013.01)
(58) Field of Classification Search
    None
    See application file for complete search history.

(56) References Cited

U.S. PATENT DOCUMENTS 4,965,840 A    10/1990    Subbarao

2014/0293117 A1*    10/2014    Murakami ........... G02B 21/365
                                                        348/349
2014/0333726 A1*    11/2014    Tokui ..................... H04N 5/208
                                                        348/46
2014/0368494 A1*    12/2014    Sakharnykh ............ G06T 5/004
                                                        345/419

FOREIGN PATENT DOCUMENTS

JP    01-167610 A    7/1989
JP    2010-016743 A    1/2010

OTHER PUBLICATIONS

Tao et al ("Sharpening Out of Focus Images using High-Frequency Transfer", 2013, Eurographics, vol. 32, pages).*

* cited by examiner

*Primary Examiner* — Bhavesh Mehta
*Assistant Examiner* — Oneal R Mistry
(74) *Attorney, Agent, or Firm* — Fitzpatrick, Cella, Harper & Scinto

(57) ABSTRACT

A depth calculation device for calculating depth information on an object from captured first image and second image with different blur, the depth calculation device comprising: an extraction unit configured to extract a first frequency component and a second frequency component from each of the first image and the second image, the first frequency component being a component of a first frequency band, the second frequency component being a component of a second frequency band, the second frequency band being lower than the first frequency band; and a depth calculation unit configured to calculate the depth information from the frequency components extracted by the extraction unit.

19 Claims, 14 Drawing Sheets

DEPTH CALCULATION DEVICE, IMAGING APPARATUS, AND DEPTH CALCULATION METHOD

BACKGROUND OF THE INVENTION

1. Field of the Invention

The present invention relates to a technique for calculating the depth of an object from a plurality of images captured by changing image capturing conditions.

2. Description of the Related Art

A depth from defocus (DFD) method such as described in Patent Literature 1 has been suggested as a method for acquiring a distance in the depth direction of an object in an image from a two-dimensional image acquired with an imaging apparatus. In the DFD method, a plurality of images with different blur are acquired by controlling the image capturing conditions (can be also referred to as image capturing parameters) of an image capturing optical system, and depth information on the object is acquired by calculating the quantity of blur or correlation value of the blur between the plurality of images by using a depth measurement object pixel and surrounding pixels thereof.

Since the quantity of blur or correlation value of the blur varies with the depth from the focal position of the image capturing optical system to the object, the depth of the object can be calculated using this relationship. In the depth measurements performed by the DFD method, the depth can be calculated with a single image capturing optical system. The resultant advantage is that the system can be easily incorporated into a commercial imaging apparatus such as a digital camera.

Patent Literature 2 describes a depth measurement device that calculates the object depth from the correlation value of the blur computed for each processing object region by using the DFD method. In this device, a weighting coefficient is set for the correlation value of the blur in pixel units for each pixel in the processing object region, and finding the weighted average of the correlation value of the blur on the basis of the weighting coefficients. As a result, highly accurate depth measurements are performed even when the object depth is spatially varied.

Patent Literature 1: Japanese Patent Application Publication No. H1-167610

Patent Literature 2: Japanese Patent Application Publication No. 2010-016743

SUMMARY OF THE INVENTION

Typical objects include design objects with periodic geometric patterns such as a stripe pattern, a grid pattern, and a checkerboard pattern. For example, such designs can be used for clothes, buildings, and household appliances. A frequency band included in such designs is restricted. In particular, a quantity including a high frequency component to be used for depth measurements tends to be small. Thus, a problem arising when depth information on the object having a texture with a small quantity including a high frequency component to be used for depth measurements is calculated is that blur variations are difficult to detect accurately and the measurement accuracy of depth information decreases.

With the method described in Patent Literature 1, the decrease in measurement accuracy of depth information depending on the frequency component of the object texture cannot be improved. Likewise, with the method described in Patent Literature 2, the decrease in measurement accuracy of depth information depending on the frequency component of the object texture also cannot be improved.

Further, with the DFD method, the above-mentioned correlation value (depth-dependent value) decreases as the object position withdraws from the focus position. However, where the distance from the focus position is too large, the correlation value conversely increases. This region essentially should be considered as unsuitable for depth measurements, and with methods that do not take this issue into account, such as the methods described in Patent Literatures 1 and 2, erroneous depth is calculated.

Thus, highly accurate depth measurements can be performed by enabling adequate measurements regardless of the frequencies included in the object, or enabling the detection of a region in which accurate depth calculation is impossible.

With the abovementioned problems in view, it is an objective of the present invention to calculate depth information with high accuracy in depth measurements performed by the DFD method.

The first aspect of the present invention is a depth calculation device for calculating depth information on an object from captured first image and second image with different blur, the depth calculation device comprising: an extraction unit configured to extract a first frequency component and a second frequency component from each of the first image and the second image, the first frequency component being a component of a first frequency band, the second frequency component being a component of a second frequency band, the second frequency band being lower than the first frequency band; and a depth calculation unit configured to calculate the depth information from the frequency components extracted by the extraction unit, wherein the depth calculation unit includes: a first depth-dependent value calculation unit configured to calculate a first depth-dependent value from a difference in blur between the first frequency component of the first image and the first frequency component of the second image; a second depth-dependent value calculation unit configured to calculate a second depth-dependent value from a difference in blur between the second frequency component of the first image and the second frequency component of the second image; and a depth information calculation unit configured to calculate the depth information on the basis of the first depth-dependent value and the second depth-dependent value.

The second aspect of the present invention is a depth calculation device that calculates depth information on an object from captured first image and second image with different blur, the depth calculation device comprising: an extraction unit configured to extract frequency components of n (n is integer equal or greater than 2) frequency bands from each of the first image and the second image; and a depth calculation unit configured to calculate the depth information from the frequency components extracted by the extraction unit, wherein the depth calculation unit includes: a depth-dependent value calculation unit configured to calculate a depth-dependent value with respect to each of n frequency components on the basis of the frequency components extracted from the first image and the second image; a determination unit configured to determine whether or not depth measurements can be performed with respect to each region included in the first image on the basis of an i-th (i is integer from 1 to n−1) high frequency component, this determination being made from a depth-dependent value corresponding to an (i+1)-th high frequency component of the each region; and a depth information calculation unit configured to calculate the depth information with respect to each region included in the first image on the basis of the depth-dependent value corresponding to the highest frequency component among the frequency components with which depth measurements for the regions are possible.

The third aspect of the present invention is a depth calculation method for calculating depth information on an object from captured first image and second image with different blur, the depth calculation method comprising: an extraction step for extracting a first frequency component and a second frequency component from each of the first image and the second image, the first frequency component being a component of a first frequency band, the second frequency component being a component of a second frequency band, the second frequency band being lower than the first frequency band; and a depth calculation step for calculating the depth information from the frequency components extracted in the extraction step, wherein the depth calculation step includes: a first depth-dependent value calculation step for calculating a first depth-dependent value from a difference in blur between the first frequency component of the first image and the first frequency component of the second image; a second depth-dependent value calculation step for calculating a second depth-dependent value from a difference in blur between the second frequency component of the first image and the second frequency component of the second image; and a depth information calculation step for calculating the depth information on the basis of the first depth-dependent value and the second depth-dependent value.

The fourth aspect of the present invention is a depth calculation method for calculating depth information on an object from captured first image and second image with different blur, the depth calculation method comprising: an extraction step for extracting frequency components of n (n is integer equal or greater than 2) frequency bands from each of the first image and the second image; and a depth calculation step for calculating the depth information from the frequency components extracted in the extraction step, wherein the depth calculation step includes: a first depth-dependent value calculation step for calculating a depth-dependent value with respect to each of n frequency components on the basis of the frequency components extracted from the first image and the second image; a determination step for determining whether or not depth measurements can be performed with respect to each region included in the first image on the basis of an i-th (i is integer from 1 to n−1) high frequency component, this determination being made from a depth-dependent value corresponding to an (i+1)-th high frequency component of the each region; and a depth information calculation step for calculating the depth information with respect to each region included in the first image on the basis of the depth-dependent value corresponding to the highest frequency component among the frequency components with which depth measurements for the regions are possible.

In accordance with the present invention, depth information can be measured with high accuracy in depth measurements performed by the DFD method.

Further features of the present invention will become apparent from the following description of exemplary embodiments with reference to the attached drawings.

DESCRIPTION OF THE EMBODIMENTS

The present invention relates to a depth calculation technique using the DFD method. Thus, the present invention relates to a depth calculation technique by which two or more images captured by changing image capturing conditions are used and depth information in the depth direction of an object is calculated on the basis of a difference in blur between those images. In the present description, a technique is suggested by which the depth information on the object is calculated with high accuracy by the DFD method even when images are used that are captured with an imaging apparatus having a plurality of channels. The related depth detection technique can be implemented as a function of an image processing device (image processing engine) installed in an imaging apparatus such as a digital camera, a digital video camera, or a monitoring camera. The results of depth detection are used for image processing (cut-out of objects, background defocusing, impartment of defocusing effect, skin beautification processing, and ultrahigh-resolution treatment) of the captured images.

<Principle of Depth Information Calculation>

Figure 1:
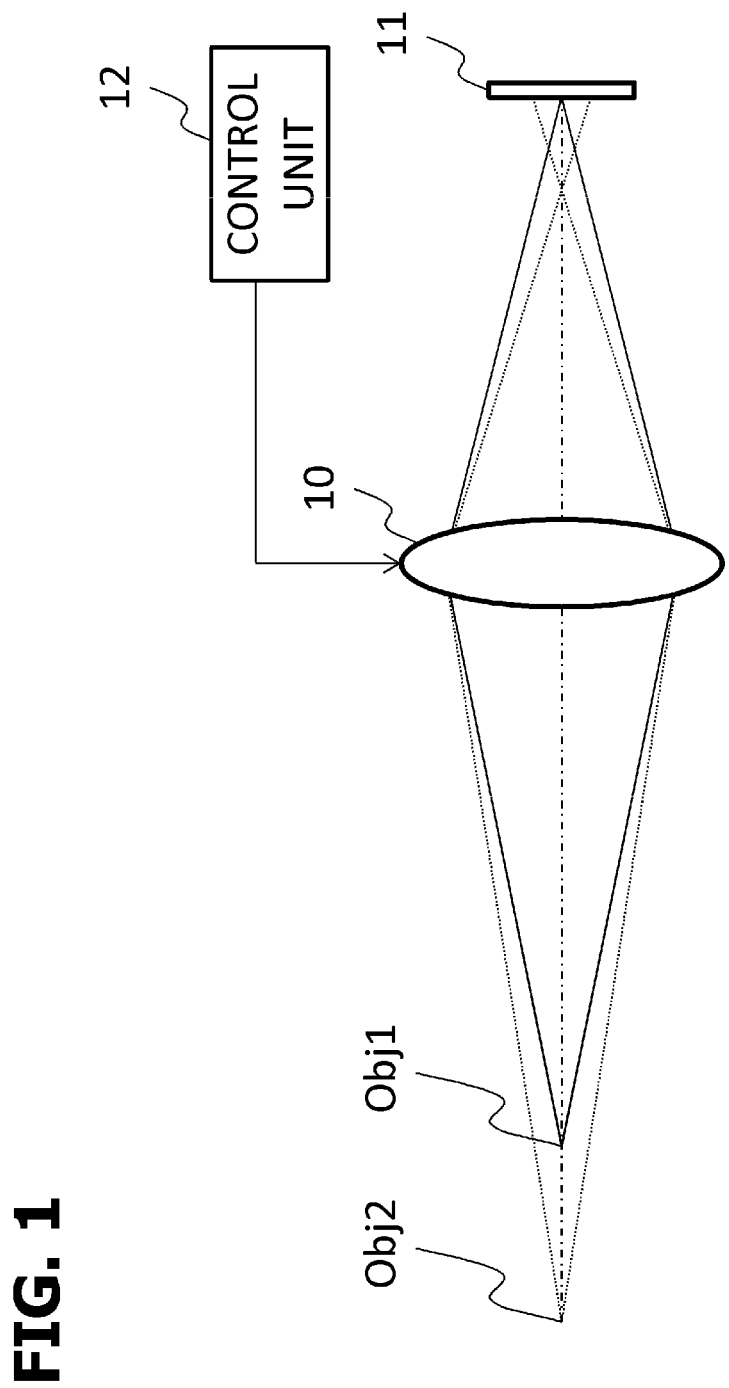
FIG. 1 is an explanatory drawing illustrating the focus position of an image capturing optical system.

FIG. 1 shows schematically the focus position of an image capturing optical system. Focus bracket image capturing, which is one of the image capturing methods for depth information calculation, is explained below with reference to FIG. 1.

FIG. 1 shows an image capturing optical system 10, an image sensor 11, and a control unit 12. The image capturing optical system 10 is constituted by a plurality of lenses. The image sensor 11 is an image sensor such as CMOS or CCD. The control unit 12 controls the image capturing optical system.

When an image for depth information calculation is captured, first, the focus of the image capturing optical system 10 is set by the control unit 12 to a first focus position Obj1, and the image of the object is captured via an optical path shown by solid lines. Then, the control unit 12 changes the focus of the image capturing optical system 10 to a second focus position Obj2, and the image of the object is captured via an optical path shown by broken lines. As a result, two images with different blur can be acquired. The image capturing method in which the focus position is thus changed, among the image capturing conditions (image capturing parameters), is called focus bracket image capturing. Aperture bracket image capturing in which the aperture diameter is changed when two images are captured is another image capturing method by which two images are imparted with different blur by changing image capturing conditions. A method for capturing two (or a plurality of) images with different blur may be focus bracket image capturing, aperture bracket image capturing, or another image capturing method.

FIG. 1 shows an example for an image sensor having one image sensor, but such a configuration is not limiting, and three image sensors (the so-called three-plate image sensors) with an image sensor arranged for each color may be also used.

In depth information calculations of the present example, depth information is estimated by using the correlation of two captured images in a small region in which the same object is photographed. Where camera shake or object movement is absent while two images are captured, a small region of the same location is used, but where camera shake or object movement is present, a small region is used in which the same object searched by alignment processing has been retrieved. The explanation below assumes that camera shake or object movement is absent, but the same procedure can be performed by using a small region in which the same object is photographed even when camera shake or object movement is present.

Where the object is at the focus position of the image capturing optical system 10, a high sharpness is obtained, and the sharpness decreases as the object moves from the focus position of the image capturing optical system 10. The sharpness disappears at a certain distance from the focus position.

In the present embodiment, frequency components of a specific frequency band are extracted from two captured images (first image and second image), and the depth information on the object is estimated by detecting the variation in the blur of the two extracted frequency components.

More specifically, the specific frequency components are extracted from a small region in the same location of two captured images, the correlation quantity in the two extracted frequency components is calculated, and the depth information on the object is calculated from the correlation quantity. The correlation quantity NCC in the small region of the two frequency components is calculated by Equation (1).

[Math. 1]

$$NCC = \frac{\sum (I1_i - I1_{av})(I2_i - I2_{av})}{\sqrt{\sum (I1_i - I1_{av})^2} \sqrt{(I2_i - I2_{av})^2}} \quad \text{Equation (1)}$$

Here, I1i is a signal value in the small region of the first captured image, I1av is the average value of signal values in the small region for the first captured image, I2i is a signal value in the small region of the second captured image, I2av is the average value of signal values in the small region for the second captured image.

In the DFD method of the focus bracket system, the position with the highest correlation quantity is the middle point of the focus positions of the two images, and the correlation quantity decreases with the distance from this position. By using such a relationship, it is possible to determine the distance separating the position of the object and the middle point of the focus positions of the two images.

Meanwhile, it is also possible to determine whether the object is positioned on the front side (imaging apparatus side) or rear side with respect to the middle point of the focus positions of the two images.

More specifically, where the condition of Equation (2) below is fulfilled, the object is at the focus position side of the first captured image with respect to the middle point of the focus positions of the two images.

[Math. 2]

$$\Sigma(I1_i - I1_{av})^2 > \Sigma(I2_i - I2_{av})^2 \quad \text{Equation (2)}$$

Meanwhile, where the condition of Equation (3) below is fulfilled, the object is at the focus position side of the second captured image with respect to the middle point of the focus positions of the two images.

[Math. 3]

$$\Sigma(I1_i - I1_{av})^2 < \Sigma(I2_i - I2_{av})^2 \quad \text{Equation (3)}$$

In this case, it is assumed that the focus position of the first captured image is on the front side (imaging apparatus side) with respect to the middle point of the focus positions of the two images, and the focus position of the second captured image is on the rear side.

Thus, it is possible to determine whether the position of the object is in front or behind the middle point of the focus positions of the two images. Further, on the basis of Equation (1), it is possible to determine how far is the position of the object from the focus positions of the two captured images. Therefore, by taking the front-rear determination result into account in the correlation quantity calculated by Equation (1), it is possible to calculate a depth-dependent value taking into consideration the front-rear relationship with the focus positions. A method for taking into account the front-rear determination can involve acquiring a depth-dependent value DS that takes into account the front-rear determination by converting with the following Equation (4) the correlation quantity NCC in the pixel determined to be on the front side.

[Math. 4]

If the front-rear determination result is:  
"front side", then $DS = 2 - NCC$  
"back side", then $DS = NCC$ Equation (4)

In the present example, the depth-dependent value taking into account the front-rear determination is used in subsequent processing. However, when only the displacement from the middle point of the focus positions is needed and the front-rear determination is not needed, the abovementioned correlation quantity may be used as the depth-dependent value.

When the depth-dependent value is converted into depth information, it is possible to calculate and store in advance the relationship between defocus positions and variations in the correlation quantity in each frequency component, and to determine the defocus position by reverse calculation from the correlation quantity calculated from the two frequency components.

There are two methods for extracting frequency components to be used for calculating the above-mentioned depth-dependent value. The first method involves convolution calculating a bandpass filter, which is designed for a real space, for the captured image and extracting only the frequency component of a specific frequency band. The merit of this method is that image processing can be performed in a real space and, therefore, the computation cost is low. The second method involves Fourier transforming a captured image into an image in a frequency space, extracting only the frequency component of the specific frequency band, and returning to the real space image by reverse Fourier transformation. The merit of this method is that only the specific frequency can be extracted, as desired.

The depth information herein is the relative depth from the middle point of the focus positions of the two images, but the depth from the imaging apparatus to the object can be also determined. For this purpose, first, the depth Sobj from the imaging apparatus to the focus position of the image capturing optical system should be determined by using Equation (5).

[Math. 5]

$$\frac{1}{S_{obj}} = \frac{1}{S_{img}} - \frac{1}{f}$$  Equation (5)

Here, Simg is the depth from the image capturing optical system to the image plane, and f is the focal depth of the image capturing optical system.

Initially, the depth Sobj1 from the imaging apparatus to the focus position obtained when the first image is captured and the depth Sobj2 from the imaging apparatus to the focus position obtained when the second image is captured are determined with Equation (5). Then, the depth Sobj3 from the imaging apparatus to the middle point of the focus bracket can be determined using Equation (6).

[Math. 6]

$$S_{obj}3 = \frac{S_{obj}1 + S_{obj}2}{2}$$  Equation (6)

In the example explained hereinabove, the depth-dependent value is calculated on the basis of correlation of specific frequency components of the first captured image and second captured image, but the depth-dependent value may be also determined by another method. For example, the ratio of peak values in the specific frequency components of the first captured image and second captured image may be taken as the depth-dependent value. Since the peak values of frequency components also vary depending on the defocus amount, the depth-dependent value can be calculated on the basis of the ratio of peak values. It is also possible to determine whether a position is in front or behind the middle point of the focus positions of the first captured image and second captured image, on the basis of the greater of the first captured image peak and the second captured image peak.

Where blur variations are imparted to two captured image by the aperture bracket method in which the F value is changed, the depth information of the object determined herein becomes a relative depth from the focus position of the image capturing optical system. Likewise, the depth from the imaging apparatus to the object can be determined.

The depth information calculated in the present example may be any information, provided that it corresponds to the actual depth between the imaging apparatus and object. For example, it may be the defocus amount on the image plane side, or information such as a depth-dependent value (correlation value or brightness peak ratio) and frequency. The depth information of those types corresponds to the actual depth and makes it possible to calculate, as necessary, the actual depth. The need for actual depth depends on the application. For example, applications such as cut-out of objects, background defocusing, and impartment of defocusing effect can be realized with the depth information alone.

Example 1

Figure 2:
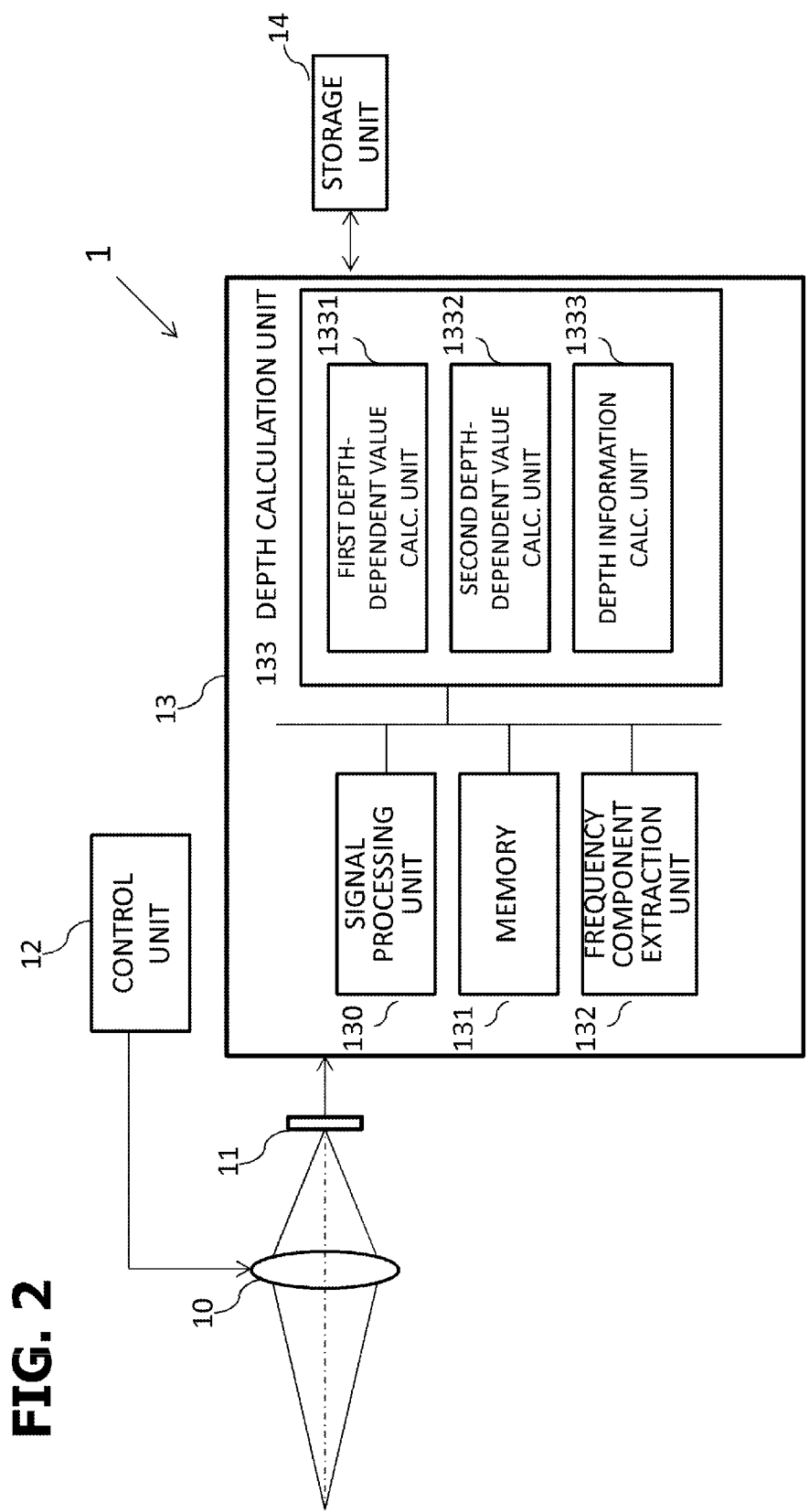
FIG. 2 shows the configuration of the imaging apparatus according to Example 1.

FIG. 2 shows schematically the configuration of the imaging apparatus according to the first example of the present invention. An imaging apparatus 1 has the image capturing optical system 10, the image sensor 11, the control unit 12, an image processing device (depth calculation device) 13, and a storage unit 14.

The image processing device 13 has a signal processing unit 130, a memory 131, a frequency component extraction unit 132, and a depth calculation unit 133. The signal processing unit 130 has a function of performing signal processing of various types, such as AD conversion, noise removal, demosaicking, brightness signal—color difference signal conversion, aberration correction, white balance correction, color correction, and gamma correction of the analog signals outputted from the image sensor 11. The digital image signals outputted from the signal processing unit 130 are accumulated in the memory 131 and supplied for recording (saving) in the storage unit 14 and depth information calculations.

The frequency component extraction unit 132 has a function of extracting image information having a frequency component of a specific frequency band in the captured image subjected to the predetermined signal processing in the signal processing unit 130. In the present example, two frequency bands are used for depth measurement, the first frequency band being a frequency region of a high frequency region, and the second frequency band being a frequency region lower than the first frequency band. More specifically, the first frequency band is a high frequency region with a period T=2.00-2.20 pixels, and the second frequency band is a frequency region of intermediate frequency with a period T=2.50-2.70 pixels. Thus, in the present example, the second frequency component is set to a period which is about 1.25 times to 1.35 times greater (frequency which is 0.80 times to 0.74 times greater) than that of the first frequency component. Fourier transformation or a bandpass filter may be used for extracting those frequency components. When Fourier transformation is used, the captured image is subjected to Fourier transformation, then the frequency component only of the frequency region to be used for depth measurements is extracted, and the extracted frequency component is subjected to reverse Fourier transformation and returned to the real space image, thereby extracting image information having the frequency component only of the frequency region to be used for depth measurement. Where a bandpass filter is used, a bandpass filter capable of extracting the frequency region to be used for depth measurement is created, and this bandpass filer is convolution computed into the real space image, thereby extracting image information having the frequency component only of the frequency region to be used for depth measurement.

The frequency component extraction unit 132 in the present example uses the Fourier transformation to acquire image information having the frequency component only of the frequency region to be used for depth measurements. More specifically, two respective frequency components (first frequency component, second frequency component) are extracted from two captured images (focused image, defocused image) with different blur that have been captured by the defocus bracket method by the imaging apparatus 1. First, the focused image is transformed into a frequency space image by Fourier transformation. Only the first frequency region is extracted therefrom, and the extracted frequency component is subjected to Fourier transformation to generate a first frequency component focused image. Further, only the second frequency region is extracted from the frequency space image and the extracted frequency component is subjected to reverse Fourier transformation to generate a second frequency component focused image. The same operation are also performed with respect to the defocused image and a first frequency component defocused image and a second frequency component defocused image are generated.

The depth calculation unit 133 is a functional unit calculating the depth information from the first frequency component and second frequency component of the focused image and defocused image, respectively. The depth information calculation unit is provided with a first depth-dependent value calculation unit 1331, a second depth-dependent value calculation unit 1332, and a depth information calculation unit 1333.

The first depth-dependent value calculation unit 1331 has a function of calculating a first depth-dependent value of the object from the difference in blur between the first frequency component focused image and first frequency component defocused image. In the present example, the first depth-dependent value of the object is calculated using the aforementioned DFD method. The first depth-dependent value determined by the first depth-dependent value calculation unit 1331 is the depth-dependent value DS represented by Equation (6) above.

The second depth-dependent value calculation unit 1332 has a function of calculating a second depth-dependent value of the object from the difference in blur between the second frequency component focused image and second frequency component defocused image. In the present example, the second depth-dependent value of the object is calculated using the aforementioned DFD method. The second depth-dependent value determined by the second depth-dependent value calculation unit 1332 is the depth-dependent value DS represented by Equation (6) above.

The depth information calculation unit 1333 has a function of calculating depth information from the first depth-dependent value and second depth-dependent value. In the present example, the first depth-dependent value and second depth-dependent value differ from each other even when the object is in the same position (defocus position). Therefore, when the depth information is calculated from the first depth-dependent value and second depth-dependent value, the conversion coefficient of depth information is determined in advance for each frequency and common depth information can be calculated at each frequency by multiplying the depth-dependent value by the conversion coefficient. For example, the configuration may be used in which the defocus position can be calculated by multiplying the depth-dependent value of each frequency by the conversion coefficient of each frequency. In such a way, the depth information calculation unit 1333 converts the depth-dependent values obtained at different frequencies into depth information with unified indexes.

Figure 3:
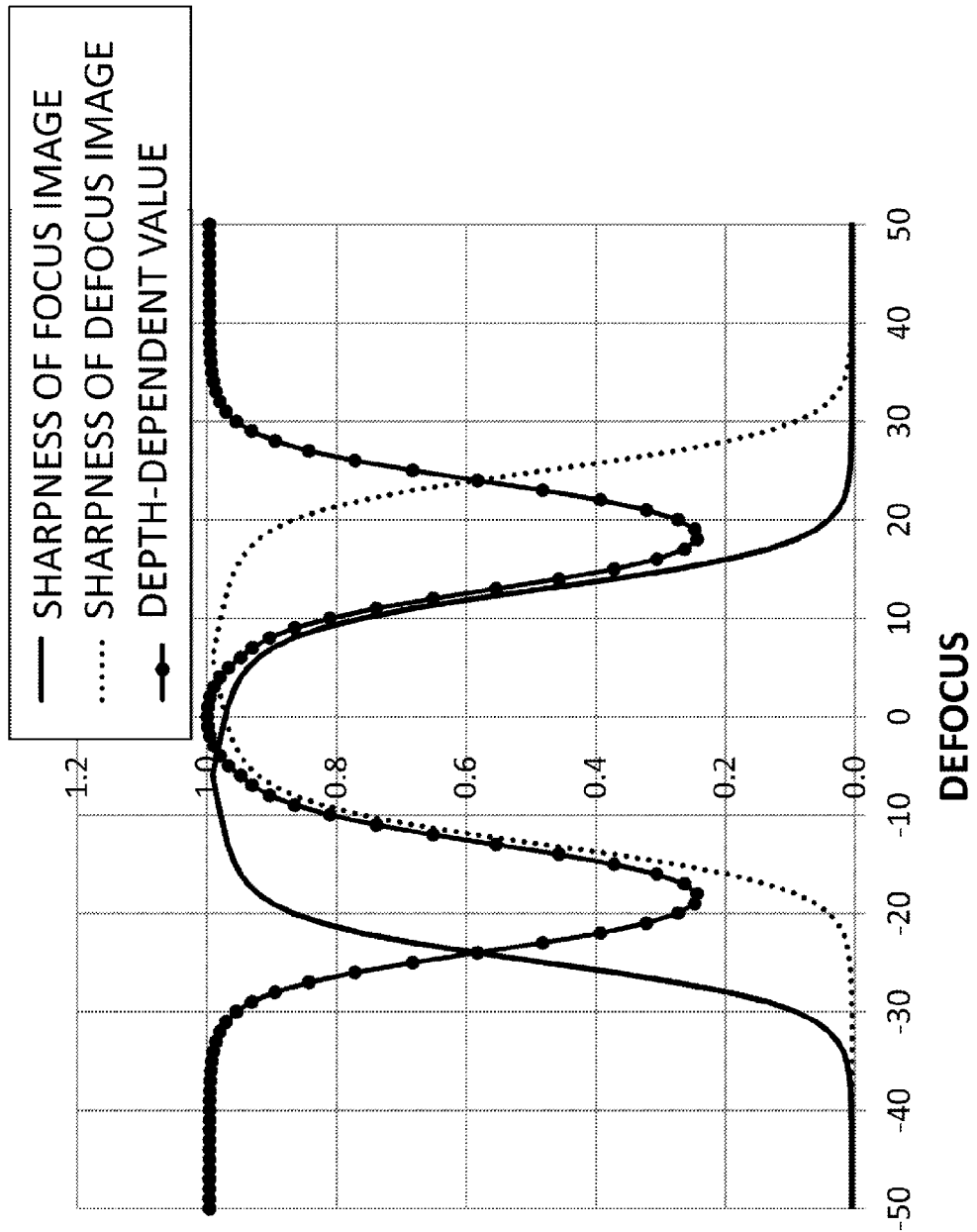
FIG. 3 is an explanatory drawing showing the depth-dependent value and sharpness of the image during focus bracket image capturing.

FIG. 3 shows the relationship between the depth-dependent value and sharpness of an image during focus bracket image capturing. In FIG. 3, the sharpness or depth-dependent value is plotted against the ordinate, and the defocus position from the center of the focus bracket is plotted against the abscissa. The solid line represents the sharpness of the focused image. The image sharpness decreases with the distance from the focus position (the defocus position in the graph is −6 position) during focused image capturing. Further, the broken line shows the sharpness of the defocused image. The image sharpness decreases with the distance from the focus position (the focus position in the graph is +6 position) during defocused image capturing. In this case, the focus bracket amount is the spacing between the focus positions of the focused image and defocused image. Therefore, the focus bracket amount is 12. In the figure, the middle point between the focus positions of the focused image and defocused image is shown as a defocus position 0. In the graph shown in FIG. 3, the solid line including round markers shows the depth-dependent value (before the front-rear determination is reflected) determined from the difference in blur between the focused image and defocused image. The depth-dependent value in this case is obtained by extracting a specific frequency component from the focused image and defocused image and calculating a correlation value (Equation (1)), and the depth-dependent value assumes a maximum value at the defocus position 0. In the example shown in FIG. 3, the depth in the frequency component with a period T=2.00-2.20 pixels is shown.

As shown in the figure, the depth-dependent value takes a maximum value (1.000) at the defocus position 0. The depth-dependent value decreases with the distance from this position, and the depth-dependent value decreases to a minimum value (0.244). Where the distance is further increased, the depth-dependent value starts increasing. The defocus position at which the depth-dependent value takes the minimum value is substantially the same as the position at which the sharpness of either of the focused image and defocused image decreases to a minimum value, and the decline in the image sharpness determines the depth measurement range. Thus, there is a strong relationship between the depth-dependent value determined from two images with different blur and the sharpness of each image.

Figure 4:
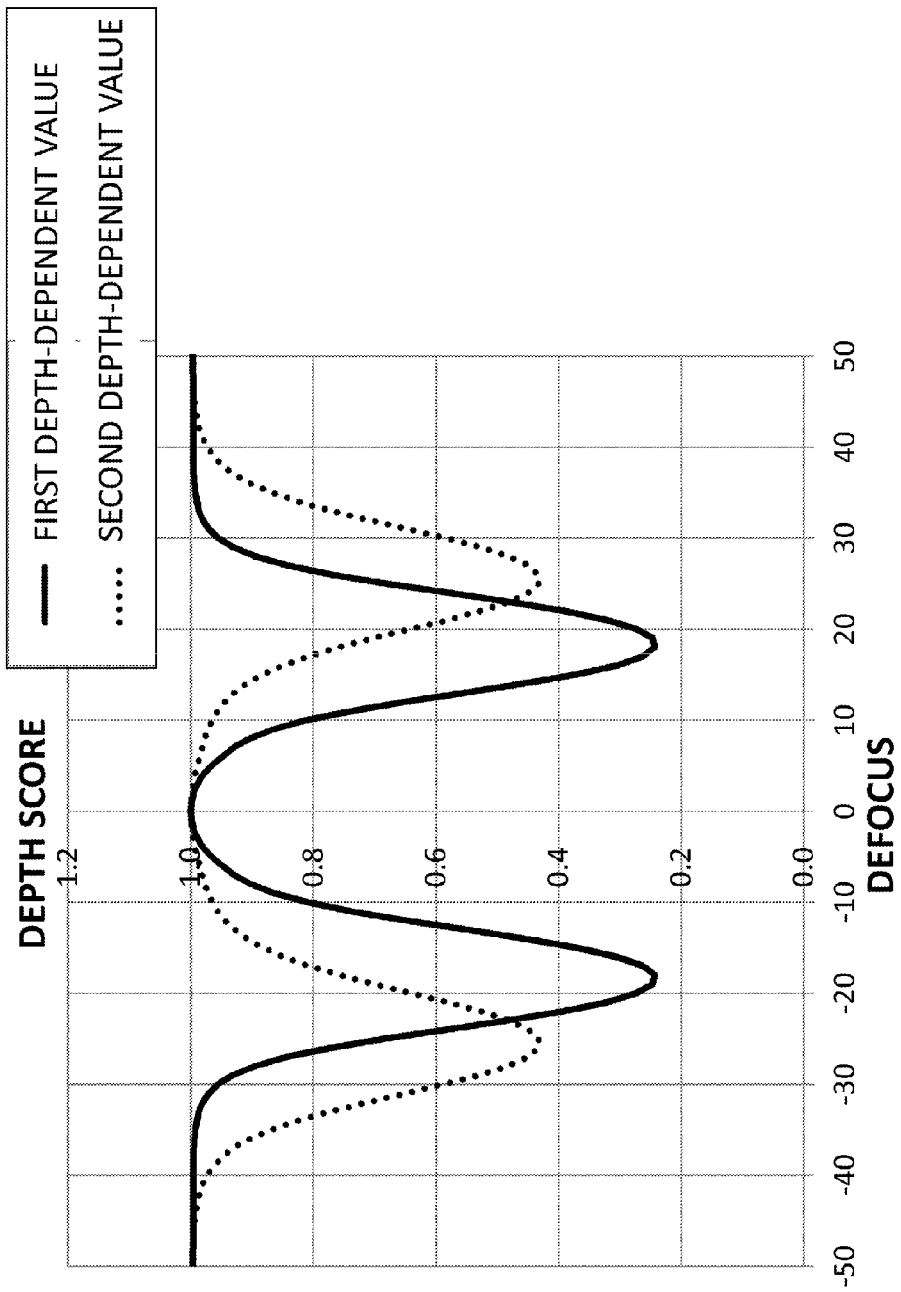
FIG. 4 is an explanatory drawing of a depth-dependent value for each frequency.

FIG. 4 shows a frequency-specific depth-dependent value (before the front-rear determination is reflected). In the graph in FIG. 4, the depth-dependent value is plotted against the ordinate, and the defocus position from the center of the focus bracket is plotted against the abscissa. The relationship with the depth-dependent value in the first frequency component and second frequency component is explained below with reference to FIG. 4.

In the graph shown in FIG. 4, the solid line is the first depth-dependent value determined from the first frequency component, which is the high frequency component, and the broken line is the second depth-dependent value determined from the second frequency component, which is the component with a frequency lower than that of the first frequency component.

The first depth-dependent value changes rapidly in response to variations in defocus, and the depth-dependent value decreases to a minimum value (score 0.244) at a small defocus position (defocus position ±18). Meanwhile, the second depth-dependent value changes gradually in response to variations in defocus, and the depth-dependent value decreases to a minimum value (score 0.433) at a large defocus position (defocus position ±25). Thus, even when the object is in the same defocus position, the calculated depth-dependent value changes depending on the frequency component used for depth measurement. However, where information in which the depth-dependent value is associated with the defocus position in each frequency component is acquired in advance, the defocus position can be calculated by the depth-dependent value in the respective frequency component. As a result, by using any frequency component, it is still possible to perform the conversion to the defocus position with the same index for all of the frequency components. In the imaging apparatus of the present example, information in which the depth-dependent value is associated with the defocus position in each frequency component is acquired in advance and saved for each frequency component to be used for depth measurements.

The merit of depth measurements with a high frequency component is that although the defocus range in which depth measurements can be performed is narrow, highly accurate measurements can be performed within the range in which depth measurements are possible. In object depth measurements conducted by the DFD method, in the usual case, the aperture value and focus bracket amount may be set such as to cover the depth dimension of the object for which depth measurements are to be performed and the depth measurements may be carried out by using a high frequency component. However, for certain object textures, more stable depth measurements can be performed if depth measurements is performed with a low frequency component rather than a high frequency component. Such a situation is realized when a texture including only a specific frequency component, such as periodically arranged vertical stripes or horizontal stripes, checkboard pattern, and grid shape, is the object of depth measurements. In a case where a frequency component to be used for depth measurements is not included in the object, the information that enables determination of the degree of image blur is not included. The resultant problem is that the depth information cannot be calculated correctly. Since such textures do not include a very high frequency, the problem is especially serious when a high frequency component is used for depth measurements. The aforementioned textures are often observed in designs of clothes, buildings, and household electric appliances, and because such designs are typical objects of photographing, there is an urgent need to resolve the problems.

Accordingly, in the present invention the stability of measurement accuracy determined by the texture of an object is increased by using a plurality of frequency components. In the imaging apparatus of the present example, two frequency components are used.

Figure 5:
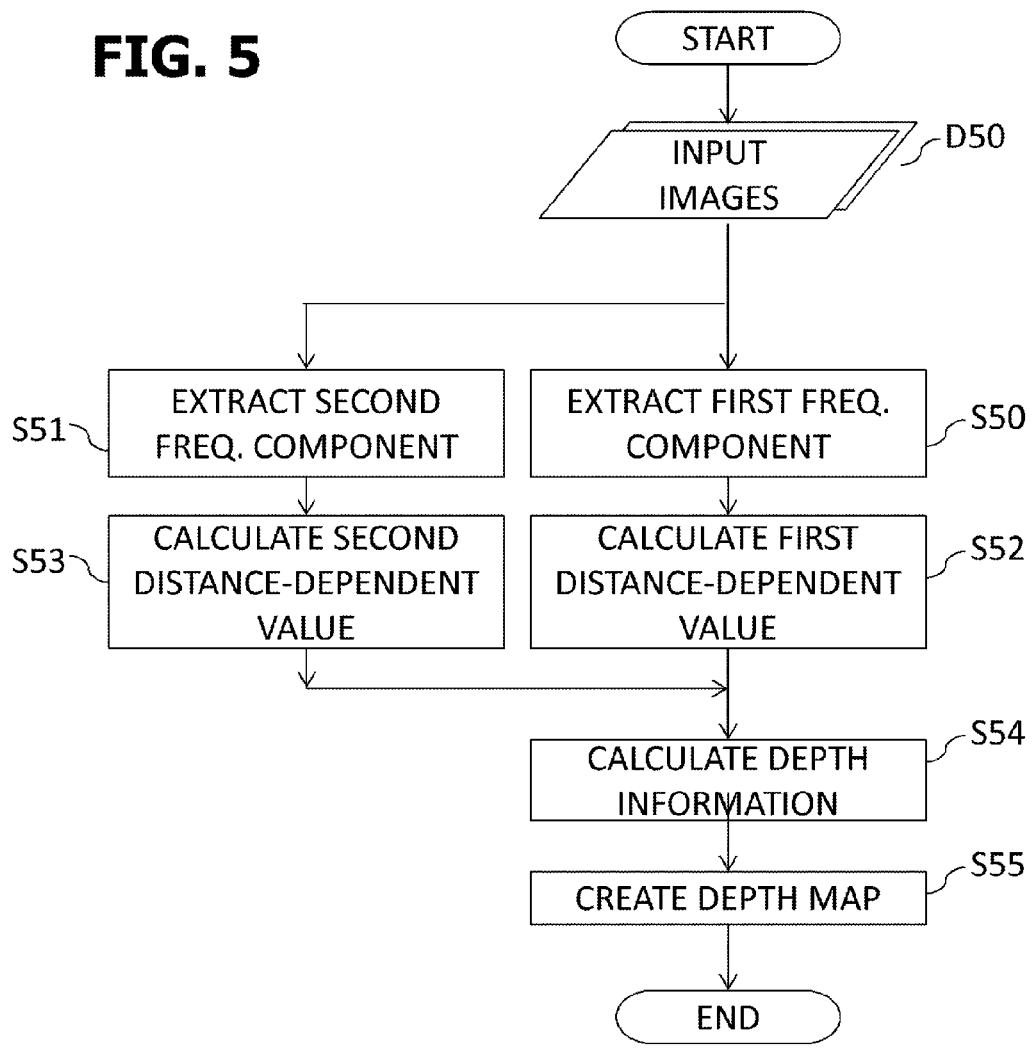
FIG. 5 is the flowchart of the depth detection method according to Example 1.

FIG. 5 is a flowchart of depth calculation processing implemented by the imaging apparatus of the present example, the operation relating to depth information calculation and creation of depth map in the imaging apparatus of the present example are explained below with reference to FIG. 5.

Input images (data D50) are a focused image and a defocused image which are two captured images with different blur that have been captured by the imaging apparatus 1 by the focus bracket method. The depth calculation unit 133 acquires the captured focused image and defocused image.

In a first frequency component extraction step (step S50), the frequency component extraction unit 132 extracts the first frequency component, which is a high frequency component, from both the focused image and the defocused image. In a second frequency component extraction step (step S51), the frequency component extraction unit 132 extracts the second frequency component, which is a frequency component lower in frequency than the first frequency component, from both the focused image and the defocused image. In the present example, the first frequency component and second frequency component are extracted from the focused image and defocused image by using Fourier transformation.

Then, in a first depth-dependent value calculation step (step S52), the first depth-dependent value calculation unit 1331 acquires the first depth-dependent value by the DFD method from the difference in blur between the first frequency component of the focused image and the first frequency component of the defocused image.

In a second depth-dependent value calculation step (step S53), the second depth-dependent value calculation unit 1332 acquires the second depth-dependent value by the DFD method from the difference in blur between the second frequency component of the focused image and the second frequency component of the defocused image.

In a depth information calculation step (step S54), the depth information calculation unit 1333 calculates the depth information on the object on the basis of the first depth-dependent value and second depth-dependent value. In this case, the depth information calculation unit 1333 converts the first depth-dependent value and second depth-dependent value into depth information of the same index (for example, the defocus position from the center of the focus bracket). When the depth information is calculated from the first depth-dependent value and second depth-dependent value, the average value of the defocus position determined from the first depth-dependent value and second depth-dependent value may be taken as the depth information.

As another method, the weighted average value of the defocus position determined from the first depth-dependent value and second depth-dependent value may be taken as the depth information. In this case, it is preferred that the confidence coefficient of the depth-dependent value of each frequency component be used as the weight. The confidence coefficient of the depth-dependent value, as referred to herein, is a value such that a smaller difference between the depth determined from the depth-dependent value and the actual depth of the object can be expected at a higher confidence coefficient. A sum total of amplitude amounts of frequency components can be used as the confidence coefficient. However, since the amplitude amount typically tends to decrease for high frequency components, a value obtained by dividing the sum total of amplitude amounts of frequency components by the frequency or frequency logarithm can be used as the confidence coefficient.

In yet another method, either of the defocus positions determined from the first depth-dependent value and second depth-dependent value is used as depth information. In this case, which defocus position to use may be changed for each pixel (each small region). More specifically, a defocus position determined from the depth-dependent value of a frequency with a higher confidence coefficient for each pixel (each small region) may be used.

In a depth map creation step (step S55), the depth calculation unit 133 creates a depth map by collecting depth information on the pixels. The depth map is also adjusted by correcting the depth information or filling in blanks therein.

In the present example, the case of two frequency components is explained, but such selection is not limiting, and if a greater number of frequency components (3, 4, or 5) are used, depth measurement accuracy would be more stabilized.

(Merits of the Present Example)

Thus, since depth-dependent values calculated from a plurality of frequency components are used when calculating the depth information on the object present in the captured image, the stability of depth measurement accuracy can be increased. Ideally, the same depth information is obtained by using any frequency, but the depth information determined from the frequency components differs depending of the frequency components contained in the object. In such a case the depth measurement accuracy is stabilized by using the average value of depth information determined from the depth-dependent values calculated from a plurality of frequency components.

The stability of depth measurement accuracy can be further increased by determining the confidence coefficient with reference to the amplitude amount of frequency components and weighting according to the confidence coefficient, or by selecting a frequency component with a high confidence coefficient for each pixel.

In the present example, the depth information on the object is calculated by the DFD method, but such a procedure is not limiting, and for example, a depth from focus (DFF) method may be also used. Both in the DFF method and the DFD method, depth information on the object is calculated by using variations in the blur. More specifically, a large number of images are captured by changing the focus position of the image capturing optical system a large number of times, the most focused image is retrieved from those images, and depth information on the object is calculated on the basis of the focus position of the retrieved image.

With the DFF method, a measurement error of depth information likewise appears and becomes a problem when the blur is changed by factors other than the depth. Therefore, depth information with good measurement accuracy can be calculated by using the present example.

Further, in the present example, the predetermined frequency components are extracted by Fourier transformation, but such a procedure is not limiting. For example, the captured image may be filtered using a bandpass filter. In this case, the frequency component extraction unit 132 is configured to include the first bandpass filter and second bandpass filter corresponding to the two above-mentioned frequency regions. The frequency component extraction unit 132 acquires the first frequency region image and second frequency region image by performing convolution calculations of the respective bandpass filters according to the captured image.

Further, a method for extracting a low-frequency component from the captured image is preferred in which the frequency component is extracted after reducing the captured image in size. In such a case, the same bandpass filter can be used any number of times even if the frequency band of the frequency component to be extracted is changed, and it is not necessary to have a plurality of filters.

Example 2

Example 2 of the present invention is explained below. By contrast with Example 1, in Example 2, a pixel or small region located outside the depth measurement range of depth information calculated from a high frequency component is detected using depth information on the low-frequency component, and a score indicating the location outside the depth measurement range is assigned to the depth information on the pixel or small region detected to be outside the depth measurement range.

In an object on an image captured with an imaging apparatus, the blur on the image typically increases with the distance from the focus position. Variations in the blur between two images are most easily detected in a defocus range close to the focus position and are more difficult to detect as the defocus amount increases. Therefore, in a method for calculating the depth information on an object from variations in the blur between two images, as in the DFD method, the defocus range (depth measurement range) in which depth information can be measured is limited.

However, where depth calculations are performed without considering the depth measurement range, as in Patent Literatures 1 and 2, incorrect depth information is calculated when the object is present in the defocus position exceeding the depth measurement range. The resultant problem is that it is impossible to distinguish the correct depth information at the defocus position within the depth measurement range from the incorrect depth information at the defocus position outside the depth measurement range, and the correct depth information cannot be obtained.

Accordingly, in the present example, a region (or a pixel) in which the object is located at a position outside the depth measurement range of depth information is detected and information allowing this fact to be identified is attached to the depth information with respect to the region outside the depth measurement range. As a result, the confidence coefficient of the calculated depth information is increased.

Figure 6:
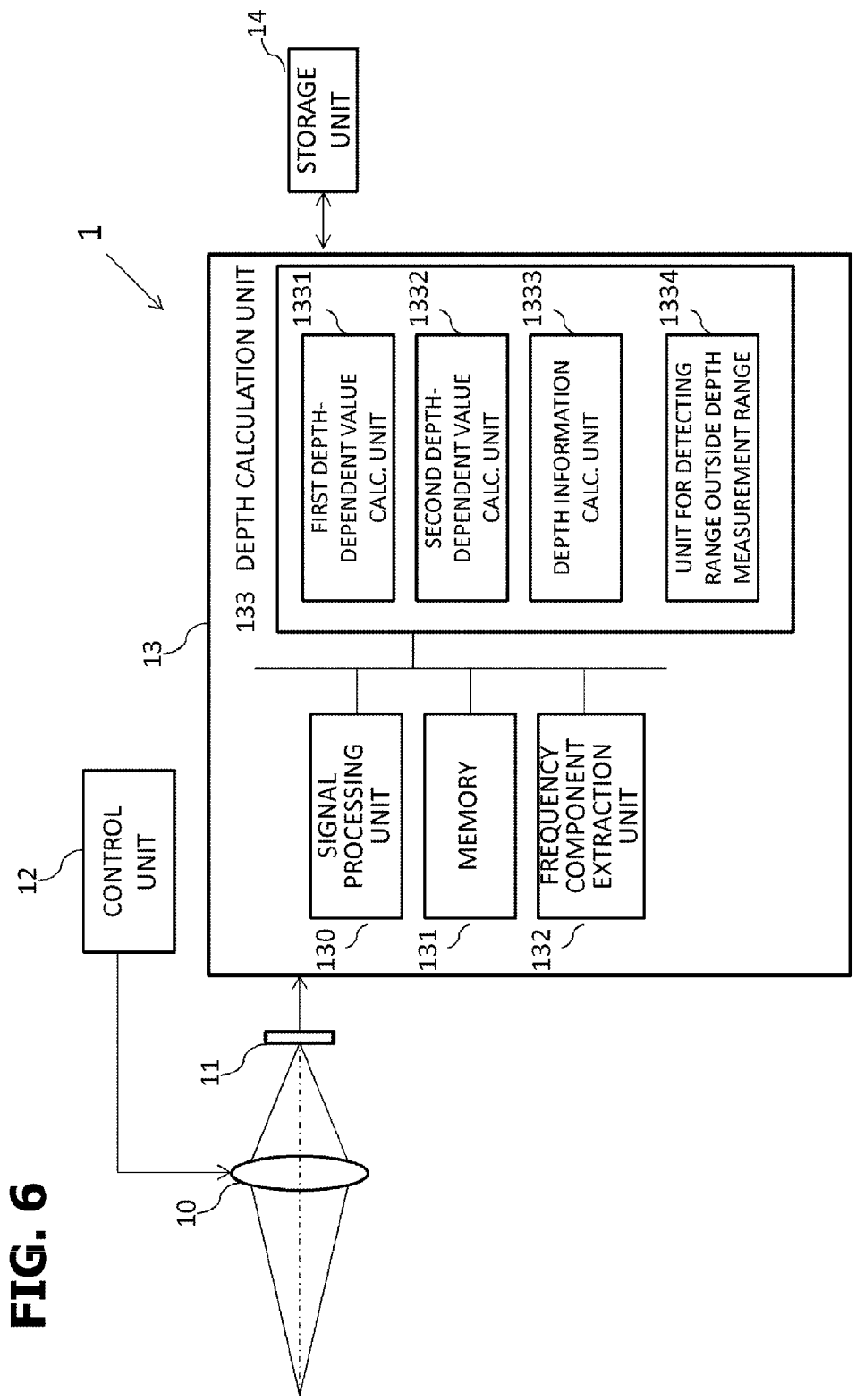
FIG. 6 shows the configuration of the imaging apparatus of Example 2.

FIG. 6 is a schematic diagram of the configuration of the imaging apparatus of the present example. The components same as those in Example 1 are assigned with same reference numerals. The attention below is focused on the components different from those of Example 1. The image processing device (depth calculation device) 13 of the imaging apparatus of Example 2 has the signal processing unit 130, memory 131, frequency component extraction unit 132, and depth calculation unit 133. The depth calculation unit 133 has a detection unit 1334 for a range outside the depth measurement range in addition to the first depth-dependent value calculation unit 1331, second depth-dependent value calculation unit 1332, and depth information calculation unit 1333.

The detection unit 1334 for a range outside the depth measurement range has a function of detecting an image region where the object located at the defocus position exceeding the range in which depth measurement using a high frequency component (first frequency component) can be performed is photographed.

Figure 7:
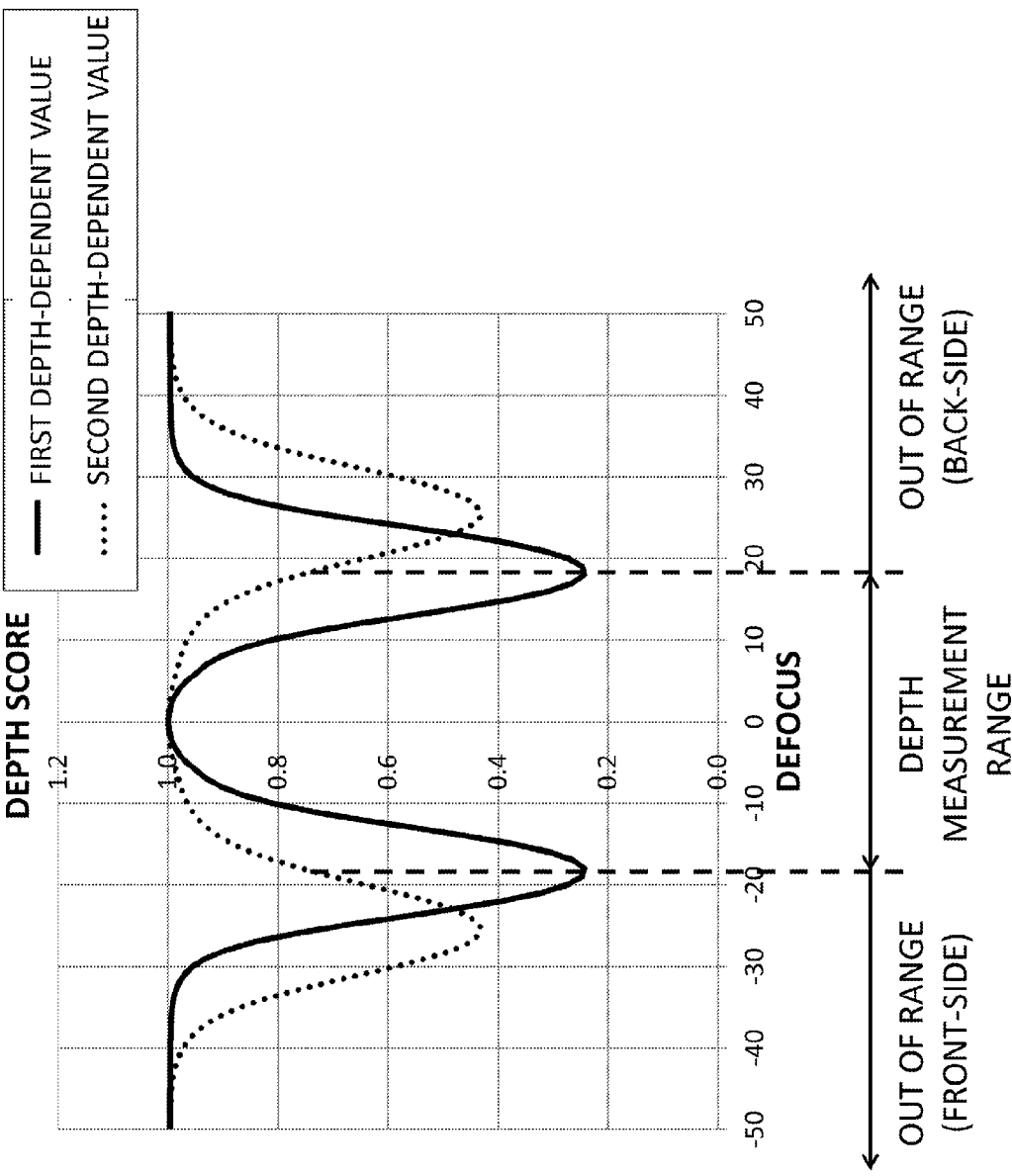
FIG. 7 is an explanatory drawing of a depth-dependent value for each frequency.

FIG. 7 shows depth information for the frequencies same as those in FIG. 4. The range in which depth measurements can be performed at the first frequency component is explained below with reference to FIG. 7. The range in which depth measurement using the first frequency component can be performed includes a position at which the defocus amount is zero (middle point of the focus positions of the focused image and defocused image) and extends as far as the defocus positions at which the first depth-dependent value assumes a minimum value. In the example shown in FIG. 7, this range extends from the defocus position −18 on the front side (minus side) at which the first depth-dependent value assumes a minimum value (score 0.244) to the defocus position +18 on the rear side (plus side) at which the score likewise assumes a minimum value. This range is called the depth measurement range of the first depth-dependent value, and the defocus range on the outside thereof is called the range outside the depth measurement range of the first depth-dependent value.

FIG. 7 shows each of the ranges. Outside the depth measurement range, the score gradually increases with the increase in the defocus amount and the score eventually becomes 1. Since the defocus position with the same score as the score outside the depth measurement range is present in the depth measurement range, the depth-dependent value outside the measurement range becomes erroneous depth information. For this reason, it is necessary to distinguish the zone inside the depth measurement range from that outside the depth measurement range, use the depth-dependent value inside the depth measurement range, and correct the depth-dependent value outside the depth measurement range.

Accordingly, in the present example, the correct depth information and depth image (depth map) are acquired by distinguishing the zone inside the depth measurement range of the frequency component to be used for depth measurements from that outside the depth measurement range and correcting the depth-dependent value outside the depth measurement range.

FIG. 7 shows the first depth information acquired by the DFD method by using the first frequency component to be used for depth measurement and the second depth information acquired by the DFD method by using the second frequency component of a frequency lower than that of the first frequency component. In the present example, the frequency components are the same as those of Example 1, the first frequency component is a high frequency region with a period of T=2.00-2.20 pixels, and the second frequency component is a frequency region of intermediate frequency with a period of T=2.50-2.70 pixels.

Likewise, for the second depth-dependent value, the score of depth information decreases from 1 with the distance from the defocus position 0, but the score decrease rate is lower than that for the first depth-dependent value. The defocus position ±25 at which the score of the second depth-dependent value assumes a minimum value of 0.433 is also farther than that for the first depth-dependent value.

For this reason, at the rear end (defocus position +18) of the depth measurement range of the first depth-dependent value, the second depth-dependent value assumes a value of 0.759 which is larger than the minimum value. Therefore, where the second depth-dependent value is equal to or less than 0.759, even when the object is positioned farther than the defocus position +18, the position thereof can be understood to be farther than the defocus position +18. Thus, in a region (or pixel) in which the second depth-dependent value is less than a predetermined threshold (in this case, 0.759), it is clear that the defocus position thereof is outside the depth measurement range of the first depth-dependent value. This threshold can be calculated in advance from the first frequency component and second frequency component and also the characteristics of the optical system. As the defocus amount increases, the second depth-dependent value also increases and exceeds the threshold (0.759). As follows from FIG. 7, the region in which depth measurements can be performed using the first frequency component can be determined by using the following two criteria: the second depth-dependent value is equal to or greater than a predetermined threshold (or the second depth-dependent value is within a range from the predetermined threshold to 1.0), and the first depth-dependent value is less than the second depth-dependent value. In other words, the region in which the depth measurements using the first depth-dependent value are impossible is the region satisfying the following condition: the second depth-dependent value is less than the predetermined threshold (or the second depth-dependent value is outside a range from the predetermined threshold to 1.0), or the second depth-dependent value is less than the first depth-dependent value.

Further, the range outside the depth measurement range on the front side can be distinguished from the range outside the depth measurement range on the rear side on the basis of whether the sum of squares of the difference with the average value of the amplitudes of the second frequency component is larger for the focused image or defocused image. This is because the abovementioned sum of squares decreases with the increase in the focus shift amount. In the present example, since the focus position in the defocused image has been shifted to the rear side (FIG. 3), it is possible to determine the front side when the sum of squares of the focused image is large and determine the rear side when the sum of squares of the defocused image is large.

The example shown in FIG. 7 is explained using the depth-dependent value before the front-rear determination is taken into account, but the determination of the depth measurement range can be likewise performed by using the depth-dependent value (Equation (4)) after the front-rear determination has been taken into account. In this case, a graph is obtained in which the depth-dependent value is turned back at the score 1 as a center on the front side with respect to the middle point of the focus positions of the focused image and defocused image. Therefore, the range in which depth measurements using the first frequency component can be performed becomes a region in which the second depth-dependent value assumes a value within a range from 0.759 to 1.241. Furthermore, where the relationship between the first depth-dependent value and second depth-dependent value is considered, at the focus position on the front side (the region in which the depth-dependent value is equal to or greater than 1), the region in which the first depth-dependent value is larger than the second depth-dependent value is the range in which depth measurements are possible. At the focus position on the rear side (the region in which the depth-dependent value is equal to or less than 1), the region in which the first depth-dependent value is less than the second depth-dependent value is the range in which depth measurements are possible. Where the depth measurement range is detected using the depth-dependent value after the front-rear determination has been taken into account, it is possible to determine whether the range outside the depth measurement range is on the front side or rear side based on whether the depth-dependent value is greater or less than 1.

Figure 8:
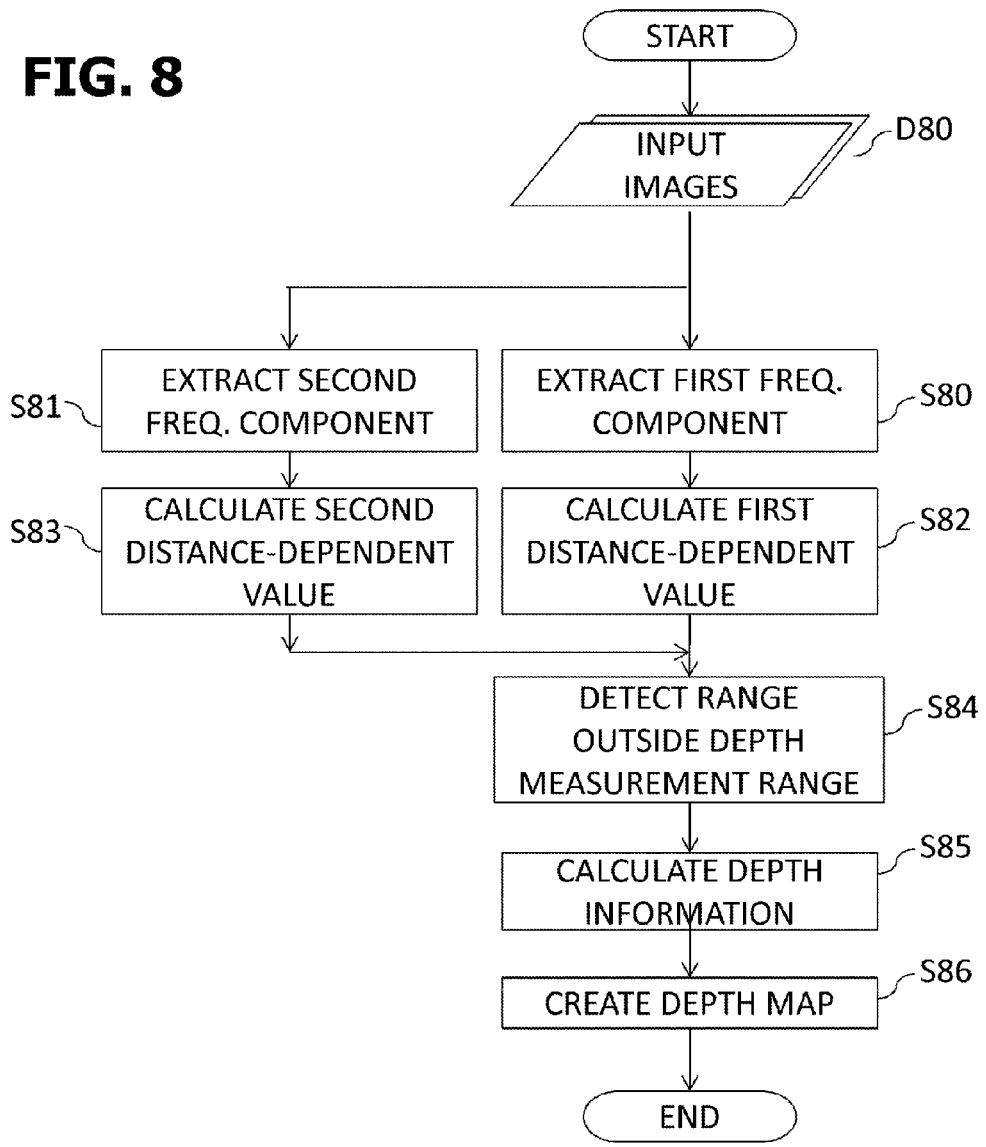
FIG. 8 is the flowchart of the depth detection method according to Example 2.

FIG. 8 is the flowchart of depth calculation processing implemented by the imaging apparatus of the present example. The method for determining the region outside the depth measurement range of the first depth-dependent value in the imaging apparatus of the present example and the operations relating to the creation of the depth map by using the correct depth-dependent value are explained below with reference to FIG. 8.

Input images (data D80) are a focused image and a defocused image which are two captured images with different blur that have been captured by the imaging apparatus 1 by the focus bracket method. The depth calculation unit 133 acquires the captured focused image and defocused image.

In a first frequency component extraction step (step S80), the frequency component extraction unit 132 extracts the first frequency component, which is a high frequency component, from each of the focused image and defocused image. In a second frequency component extraction step (step S81), the frequency component extraction unit 132 extracts the second frequency component, which is a frequency component lower in frequency than the first frequency component, from each of the focused image and defocused image. In the present example, the first frequency component and second frequency component are extracted from the focused image and defocused image by using Fourier transformation.

Then, in a first depth-dependent value calculation step (step S82), the first depth-dependent value calculation unit 1331 acquires the first depth-dependent value by the DFD method from the difference in blur between the first frequency component of the focused image and the first frequency component of the defocused image.

In a second depth-dependent value calculation step (step S83), the second depth-dependent value is acquired by the DFD method from the difference in blur between the second frequency component of the focused image and the second frequency component of the defocused image.

In a step for detecting a range outside the depth measurement range (step S84), the unit 1334 for detecting a range outside the depth measurement range detects, on the basis of the first depth-dependent value and second depth-dependent value, a region (a region outside the depth measurement range of the first depth-dependent value) in which depth measurements using the first frequency component are impossible. More specifically, a range of values that can be assumed by the second depth-dependent value at a defocus position between the front end and rear end of the depth measurement range of the first depth-dependent value is determined in advance, and this range of values is stored as information for determining a range outside the depth measurement range. Where the second depth-dependent value determined by the second depth-dependent value calculation unit 1332 is outside the abovementioned range, it is determined that the pixel or small region thereof is outside the depth measurement range of the first depth-dependent value.

In a depth information calculation step (step S85), the depth information calculation unit 1333 replaces the first depth-dependent value in the pixel or small region, which has been determined to be outside the depth measurement range of the first depth-dependent value in the step for detecting a range outside the depth measurement range (step S84), with a score meaning the zone outside the depth measurement range. In the pixel or small region that has been determined to be inside the depth measurement range, the depth information calculation unit 1333 calculates depth information using the first depth-dependent value as is. The depth-dependent value is directly used as depth information, but the defocus amount determined from the depth-dependent value, or the depth of the object further determined from the defocus amount may be also used.

Figure 9:
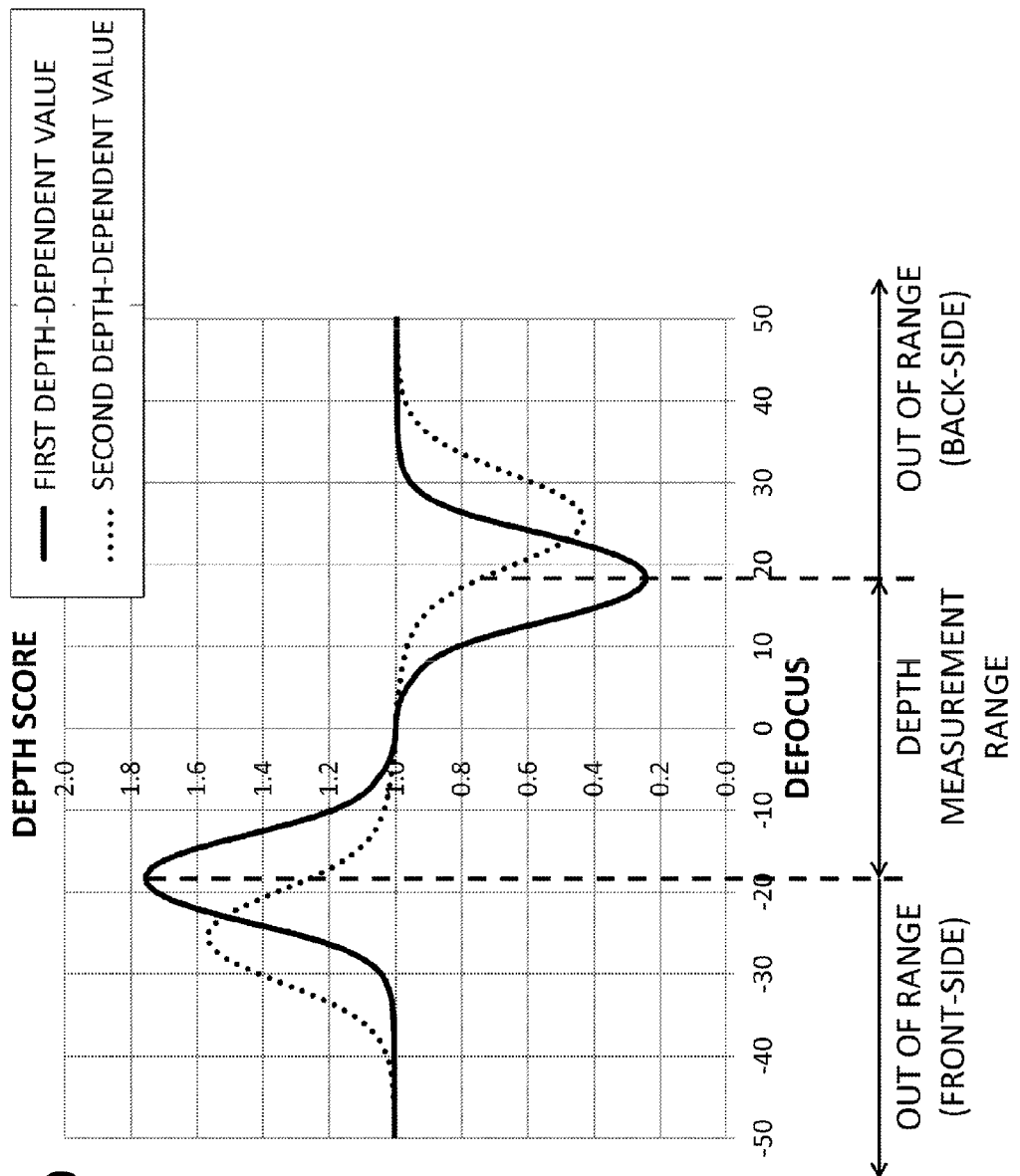
FIG. 9 is an explanatory drawing of a depth-dependent value after the front-rear determination has been taken into account.

In the imaging apparatus of the present example, the first depth-dependent value after the front-rear determination has been taken into account is calculated by a value of "1.000 to 0.244", but on the front side with respect to the center of the focus bracket, the score "1.000 to 1.756" is allocated because of the aforementioned front-rear determination. FIG. 9 shows the depth information taking into account the front-rear determination in the first depth-dependent value and second depth-dependent value in FIG. 7. This is an example of depth-dependent values taking into account the front-rear determination result according to Equation (4). In this graph, the score at the defocus position on the front side of the first depth-dependent value and second depth-dependent value is turned back at a score "1.000" as a center.

The first depth-dependent value has a value of "0.244 to 1.756", and where this value is in the depth measurement range, a score enabling confidence coefficient is obtained. The second depth-dependent value has a value of "0.433 to 1.567". The second depth-dependent value at the defocus position −18 at the front end (first depth-dependent value is 1.756) of the depth measurement range is 1.241. The second depth-dependent value at the defocus position +18 at the rear end (first depth-dependent value is 0.244) of the depth measurement range is 0.759.

Therefore, in the depth information taking into account the front-rear determination, when the second depth-dependent value is larger than "1.241", a range outside the depth measurement range can be determined to be on the front side of the first depth-dependent value, and where the second depth-dependent value is less than "0.759", a range outside the depth measurement range can be determined to be on the rear side of the first depth-dependent value. Further, when the first depth-dependent value is equal to or greater than "1.000" and less than the second depth-dependent value, a range outside the depth measurement range can be determined to be on the front side of the first depth-dependent value. Likewise, when the first depth-dependent value is equal to or less than "1.000" and greater than the second depth-dependent value, a range outside the depth measurement range can be determined to be on the rear side of the first depth-dependent value. Thus, a range outside the depth measurement range on the front side and a range outside the depth measurement range on the rear side can be detected separately from each other.

As for the score meaning a range outside the depth measurement range, for example, "2" is inputted for a range outside the depth measurement range on the front side and "0" is inputted for a range outside the depth measurement range on the rear side. In this case, in the range outside the depth measurement range on the front side, a value which is not reached in the score calculated by the DFD method and is larger than "1", thereby indicating the front side, is used. Meanwhile, in the range outside the depth measurement range on the rear side, a value which is not reached in the score calculated by the DFD method and is less than "1", thereby indicating the rear side, is used. As a result, information indicating the range outside the depth measurement range on the front side and the range outside the depth measurement range on the rear side can be imparted to the depth information. Thus, two layers are added to the score of the depth information calculated by the DFD method, and the number of layers of the depth indicating the accuracy of depth information can be increased. When the defocus amount is used as the depth information, for example, "−99" may be used as a value indicating the range outside the depth measurement range on the front side, and "99" may be used as a value indicating the range outside the depth measurement range on the rear side.

Figure 10A:
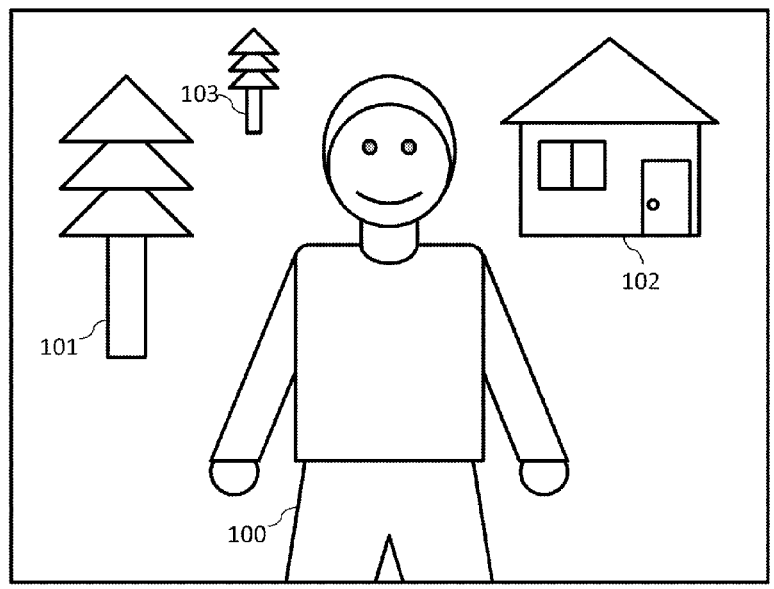
FIGS. 10A and 10B show the creation of depth map in Example 2.
Figure 10B:
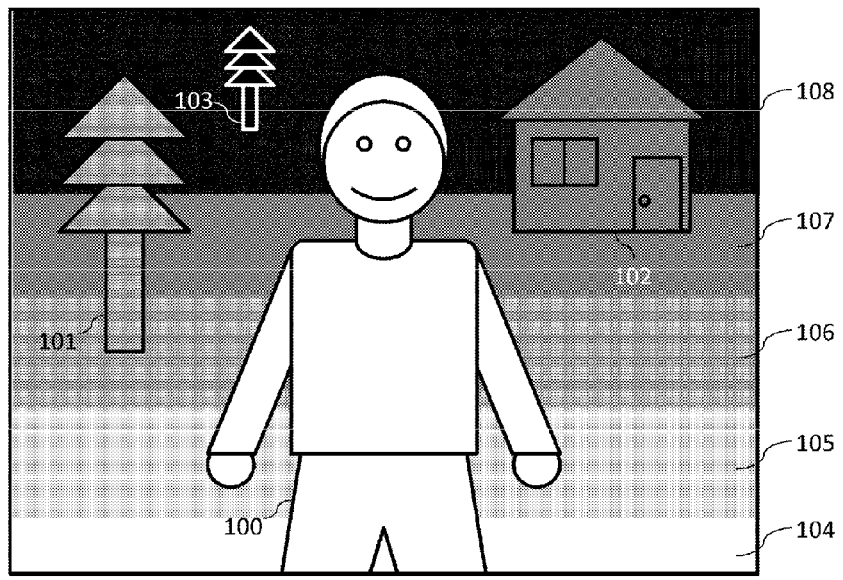

FIG. 10(A) shows the captured image captured by the imaging apparatus of the present example, and FIG. 10(B) shows the depth image created by the imaging apparatus of the present example. As shown in FIG. 10(A), four objects, namely, objects 100 to 103, are captured in the captured image. The object 100 is a person and is the main object of the present captured image. The imaging apparatus captures the first image by focusing on the main object 100, and then captures the second image by moving the focus depthwise. The object 101 is a tree and is a foreground object located behind the main object 100. The object 102 is a house and is an object of intermediate-range view located further toward the back side of the image than the tree 101. The object 103 is a tree and is a background object located further toward the back side of the image than the house 102.

The image obtained by acquiring the depth information and collecting depth information of each pixel with the imaging apparatus of the present example is the depth image shown in FIG. 10(B). The depth image is represented by a depth map having a five-layer hierarchical structure on the basis of the calculated depth information. The vicinity of the focused image (focus point position) of the first image is the first layer 104 which includes the main object 100. The second layer 105 is a defocus range somewhat behind the main object 100; the ground surface is photographed therein. The third layer 106 is the defocus range further behind the second layer 105; the tree 101 and the ground surface are photographed therein. The fourth layer 107 is the defocus range further behind the third layer 106; the house 102 and the ground surface are photographed therein. In the present example, the depth measurement range is from the first layer 104 to the fourth layer 107. The fifth layer 108 is the defocus range following the fourth layer 107; the tree 103, ground surface, and air located in the background are included therein. The fifth layer 108 is outside the depth measurement range on the rear side that has been detected by the imaging apparatus of the present example, and a depth farther than that cannot be distinguished.

Where the effect of the present example is not used, the depth information in the fifth layer 108 cannot be distinguished from the defocus position of any one of the first layer to fourth layer, and an inaccurate depth image is obtained. Where image processing, for example, such as background gradation is implemented based on such depth image, a problematic image is obtained in which an object such as the tree 103, which should be located at a distance, is not blurred and a feeling of discomfort is created.

In the present example, since the range outside the depth measurement range is detected and depth information imparted with the depth information corresponding to the range outside the depth measurement range is calculated, correct depth information is obtained. Since the depth image is created on the basis thereof, even when image processing, for example, such as background gradation is implemented, a blur size corresponding to the depth can be imparted and an image representing a natural blur feel can be created.

(Merits of the Present Example)

Thus, in the imaging apparatus of the present example, the depth measurement range of the frequency component to be used for depth measurement and the range outside the depth measurement range can be identified by using the depth-dependent value calculated from the frequency component which is lower than the frequency component to be used for depth measurements. In particular, the range outside the depth measurement range is identified and the depth information on the range outside the depth measurement range is replaced with information meaning the range outside the depth measurement range. As a result, accurate depth information can be acquired even when an object is present at a defocus position in the range outside the depth measurement range, Further, a depth map can be created by using the accurate depth information.

When the depth map obtained herein is applied, for example, to a "background gradation function", where an image with a strongly gradated background is created while changing the size of blur according to the object depth, an image having beautiful blurring can be provided. In this case, the background object is sometimes present at the defocus position in the range outside the depth measurement range of the DFD method, but since the range outside the depth measurement range of the DFD method can be detected by using the effect of the present invention, the largest blur size can be imparted to the background outside the depth measurement range. As a result, an image imparted with extremely beautiful blur can be provided.

Further, in the present example, only one frequency component for depth measurement and only one frequency component for depth measurement range detection are used, but such configuration is not limiting, and for example a plurality of frequency components for depth measurement range detection may be used. In this case, the range outside the depth measurement range in the depth information of a higher frequency component can be detected by using the depth information obtained with the lower frequency component. For example, where the third depth-dependent value is calculated using the third frequency component which has a frequency lower than that of the second frequency component, the range outside the depth measurement range in the first depth information on the outside of the defocus position ±33, which cannot be detected by merely comparing the second frequency component with the threshold, can be detected. The range outside the depth measurement range can be adequately determined by taking into account the relationship between the first depth-dependent value and second depth-dependent value, but where the score of both depth-dependent values decreases, this relationship can sometimes be reversed by the effect of noise. Therefore, the use of the third frequency component is also advantageous. Thus, where a plurality of frequency components for depth measurement range detection is used, the range outside the depth measurement range can be detected to a larger distance.

Further, since depth resolution increases with the increase in frequency, the defocus range in which the range outside the depth measurement range can be determined can be expanded, while maintaining a high detection accuracy of the range outside the depth measurement range, by using frequency components for depth measurement range detection sequentially from a high frequency as frequency components for depth measurement range detection.

Example 3

Example 3 of the present invention is explained below. In Example 2, depth information representing the range outside the depth measurement range is imparted to a small region or pixel outside the depth measurement range. Example 3 differs from Example 2 in that the depth information on the pixel or small region that has been detected to be outside the depth measurement range is replaced with the depth information calculated from the lower frequency component, and the depth measurement range is expanded. The explanation below is focused on the difference between this example and Example 2.

Figure 11:
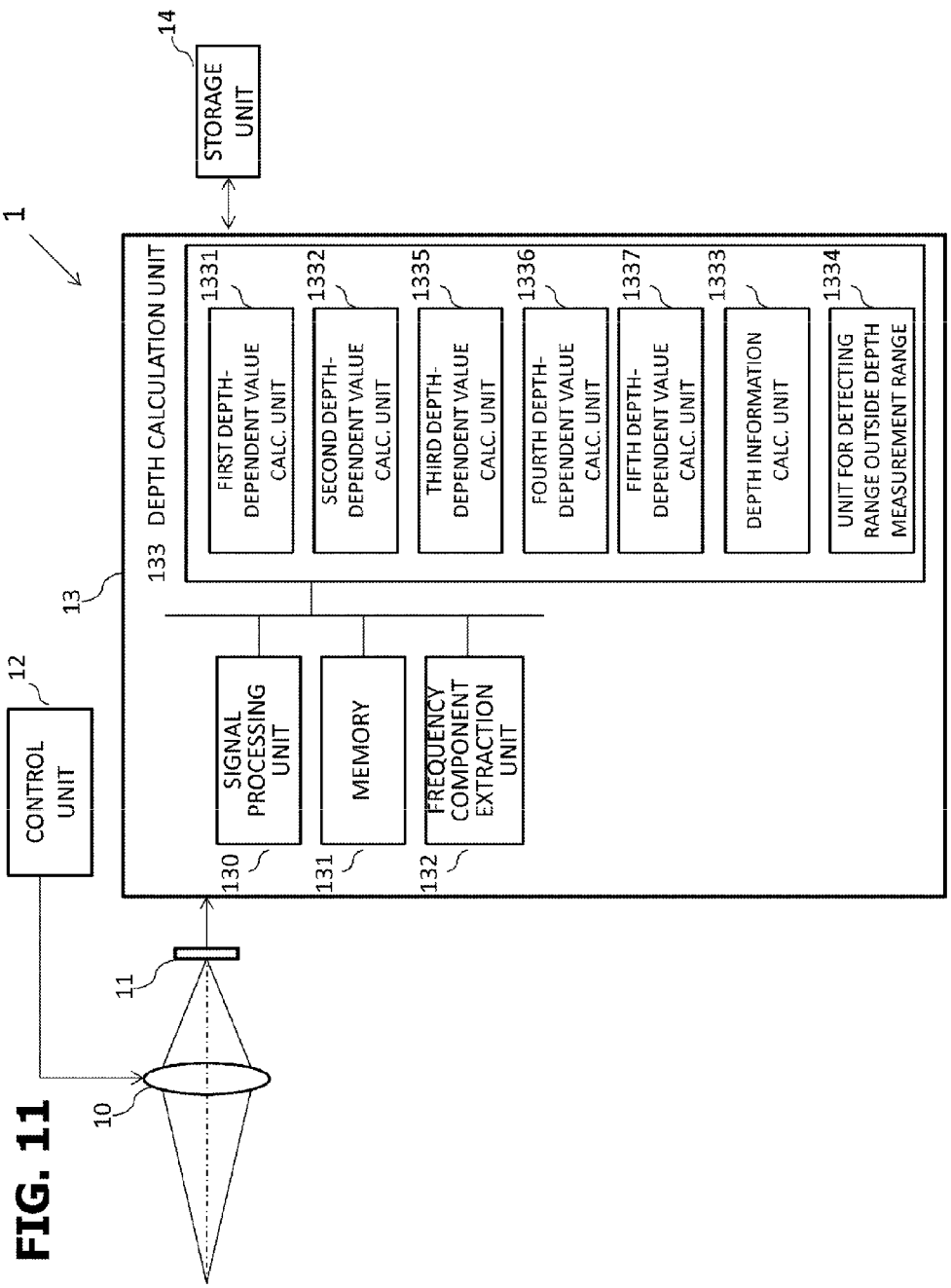
FIG. 11 shows the configuration of the imaging apparatus of Example 3.

FIG. 11 shows the schematic diagram of the configuration of the imaging apparatus of the present example.

The image processing device (depth calculation device) 13 of the imaging apparatus of Example 3 has the signal processing unit 130, memory 131, frequency component extraction unit 132, and depth calculation unit 133. The depth calculation unit 133 has a third depth-dependent value calculation unit 1335, a fourth depth-dependent value calculation unit 1336, and a fifth depth-dependent value calculation unit 1337 in addition to the first depth-dependent value calculation unit 1331, second depth-dependent value calculation unit 1332, depth information calculation unit 1333, and unit 1334 for detecting a range outside the depth measurement range.

The first to fifth depth-dependent value calculation units 1331, 1332, 1335, 1336, and 1337 in the imaging apparatus of the present example have a function of calculating depth-dependent values from the respective different frequency components.

The depth information calculation unit 1333 has a function for calculating new depth information by combining the depth-dependent values calculated by the first to fifth depth-dependent value calculation units 1331, 1332, 1335, 1336, and 1337.

Figure 12:
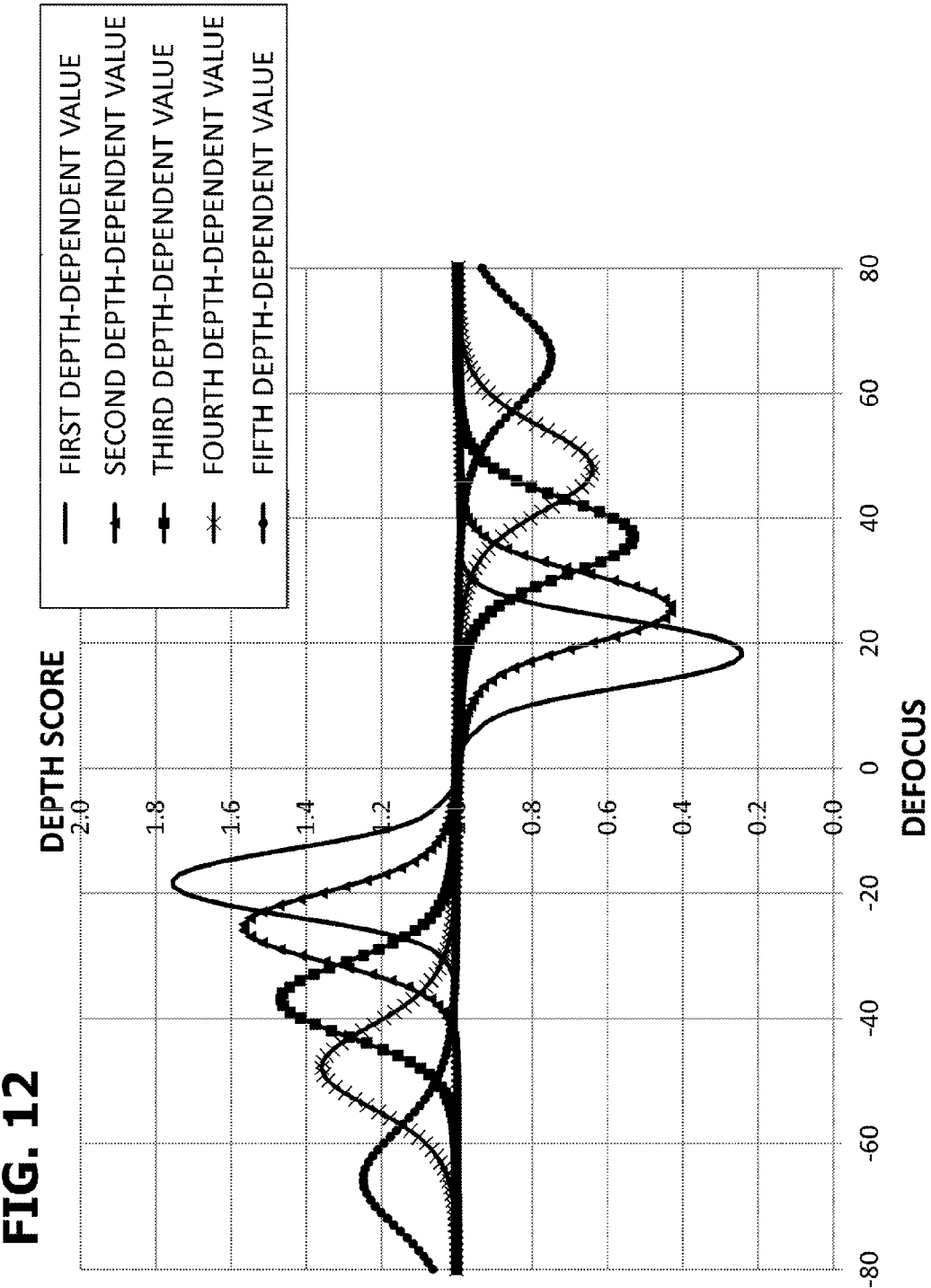
FIG. 12 is an explanatory drawing of a depth-dependent value after the front-rear determination has been taken into account.

FIG. 12 shows the depth-dependent values determined by the first to fifth frequency components. The frequency components shown in FIG. 12 take into account the front-rear determination and are represented within a score range of 0 to 2, with the score of the middle point of the focus bracket being taken as 1, the score on the front side therefrom having a value greater than 1, and the score on the rear side therefrom having a value less than 1.

In the imaging apparatus of the present example, the first depth-dependent value is calculated by the first depth-dependent value calculation unit 1331 by using the first frequency component with a period T=2.00-2.20 pixels. The second depth-dependent value is calculated by the second depth-dependent value calculation unit 1332 by using the second frequency component with a period T=2.50-2.70 pixels. The third depth-dependent value is calculated by the third depth-dependent value calculation unit 1335 by using the third frequency component with a period T=3.00-3.30 pixels. The fourth depth-dependent value is calculated by the fourth depth-dependent value calculation unit 1336 by using the fourth frequency component with a period T=3.61-4.00 pixels. The fifth depth-dependent value is calculated by the fifth depth-dependent value calculation unit 1337 by using the fifth frequency component with a period T=4.51-5.00 pixels. In the imaging apparatus of the present example, the period is set to increase gradually and the frequency is set to decrease from the first frequency component to the fifth frequency component.

The defocus position of each depth-dependent value at the end of the depth measurement range is as follows: the first depth-dependent value ±18, the second depth-dependent value ±25, the third depth-dependent value ±37, the fourth depth-dependent value ±48, and the fifth depth-dependent value ±66.

In this case, the depth measurement range based on the i-th (i is integer from 1 to 4) frequency component can be determined on the basis of the depth-dependent value corresponding to the (i+1)-th high frequency component. Where the defocus is on the front side (that is, where the depth-dependent value is greater than 1), the region in which the (i+1)-th depth-dependent value is less than the threshold is within the depth measurement range, and the region in which the depth-dependent value is equal to or greater than the threshold, is outside the depth measurement range. Conversely, where the defocus is on the rear side (that is, where the depth-dependent value is less than 1), the region in which the (i+1)-th depth-dependent value is greater than the threshold is within the depth measurement range, and the region in which the depth-dependent value is equal to or less than the threshold, is outside the depth measurement range. By combining those two cases, it is possible to determine that the region in which the (i+1)-th depth-dependent value assumes a value within a predetermined range is within the depth measurement range of the i-th depth-dependent value, and other regions are outside the depth measurement range.

More specifically, the unit 1334 for detecting a range outside the depth measurement range detects a range outside the depth measurement range of each depth-dependent value by the following conditions. A range outside the depth measurement range of the first depth-dependent value is detected by the condition that the score of the second depth-dependent value is "equal to or greater than 0.759 or equal to or greater than 1.241". A range outside the depth measurement range of the second depth-dependent value is detected by the condition that the score of the third depth-dependent value is "equal to or greater than 0.911 or equal to or greater than 1.090". A range outside the depth measurement range of the third depth-dependent value is detected by the condition that the score of the fourth depth-dependent value is "equal to or greater than 0.881 or equal to or greater than 1.119". A range outside the depth measurement range of the fourth depth-dependent value is detected by the condition that the score of the fifth depth-dependent value is "equal to or greater than 0.958 or equal to or greater than 1.042".

When a range outside the depth measurement range is detected, it is preferred that the relationship between the i-th depth-dependent value and (i+1)-th depth-dependent value be taken into account. More specifically, where the defocus is on the front side (where the depth-dependent value is greater than 1), the region in which the (i+1)-th depth-dependent value is greater than the i-th depth-dependent value is outside the depth measurement range of the i-th depth-dependent value. Where the defocus is on the rear side (where the depth-dependent value is less than 1), the region in which the (i+1)-th depth-dependent value is less than the i-th depth-dependent value is outside the depth measurement range of the i-th depth-dependent value.

By detecting a range outside the depth measurement range of each depth-dependent value, it is possible to determine that the depth-dependent value inside the depth measurement range is an effective score and the depth-dependent value outside the depth measurement range is an ineffective score.

The depth information calculation unit 1333 calculates depth information from the depth-dependent value based on the highest frequency component among the frequency components, for which depth measurements are possible, in each region. The depth information may be the defocus amount on the image plane side determined from the depth-dependent value, or the depth on the physical body side. Further, the depth information may be information on the depth-dependent value itself and the frequency band used when the depth-dependent value is calculated.

Figure 13:
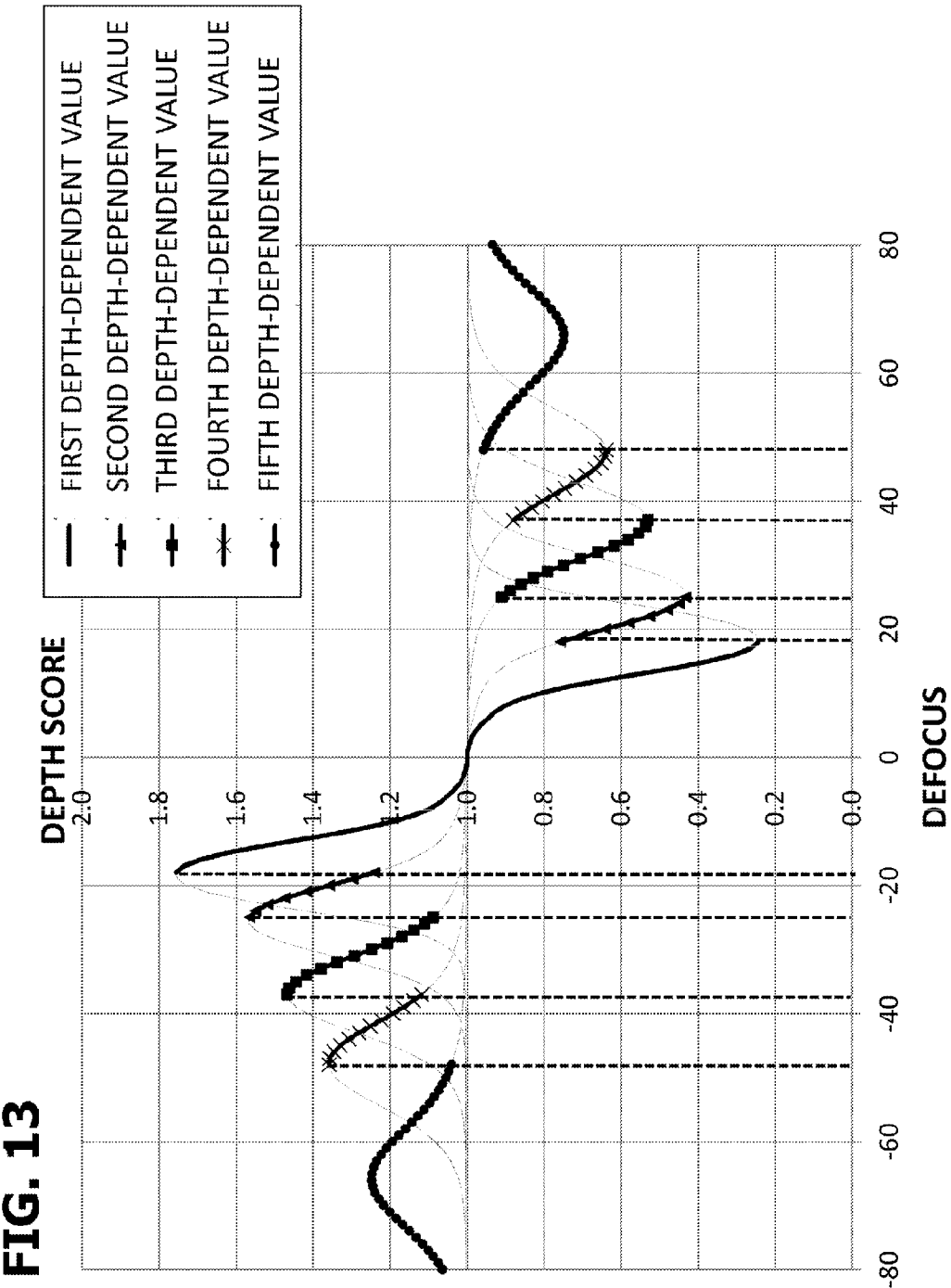
FIG. 13 shows depth information after the front-rear determination has been taken into account within the depth measurement range.

FIG. 13 shows depth information within the depth measurement range for each type of depth information. A depth information calculation method using a plurality of types of depth information in the imaging apparatus of the present example is explained below with reference to FIG. 13.

The first depth-dependent value calculated from the highest frequency region is used to handle depth calculations in a range with a small defocus amount and cover a range from the defocus position 0 to the ends (defocus positions ±18) of the depth measurement range of the first depth-dependent value. Further, the second depth-dependent value is used to handle depth information calculations at a defocused position and cover a range from the defocus positions ±18 to the ends (defocus positions ±25) of the depth measurement range of the second depth-dependent value. Further, the third depth-dependent value is used to handle depth information calculations at a further defocused position and cover a range from the defocus positions ±25 to the ends (defocus positions ±37) of the depth measurement range of the third depth-dependent value. Further, the fourth depth-dependent value is used to handle depth information calculations at a further defocused position and cover a range from the defocus positions ±37 to the ends (defocus positions ±48) of the depth measurement range of the fourth depth-dependent value. The fifth depth-dependent value calculated with the lowest frequency component is used only for detecting a range outside the depth measurement range of the fourth depth-dependent value, and depth information indicating a range outside the depth measurement range is inputted to the score of the defocus position on the outside the defocus positions ±48. Depth information is finally calculated from those effective depth-dependent values. In this case, since the scores of the depth-dependent values cannot be compared in a simple manner, conversion to a defocus position, which is a common index, is preferred. Since the coefficient in the conversion equation is different for each frequency, the conversion to the defocus position is performed by using the coefficients determined in advance.

The depth information calculated by linking a plurality of depth-dependent values in the above-describes manner expands the depth measurement range while maintaining a high depth resolution at each defocus position. The depth measurement range in the first depth-dependent value has the defocus amount of 13, whereas the depth measurement range in the depth information can be expanded to a defocus amount of 48. Thus, the expansion ratio is 3.7 times.

In the region in which depth measurements can be performed with the i-th high frequency component, depth measurements can be also performed with a higher frequency component. However, since the depth can be calculated with a better resolution as the frequency increases, the depth information in this case is determined from a depth-dependent value corresponding to the highest frequency component among the frequency components with which depth measurements are possible. The depth information may be also calculated on the basis of each depth-dependent value corresponding to a plurality of frequency components with which depth measurements are possible (for example, by averaging the depth information determined from the depth-dependent values), in the same manner as in Example 1.

Figure 14:
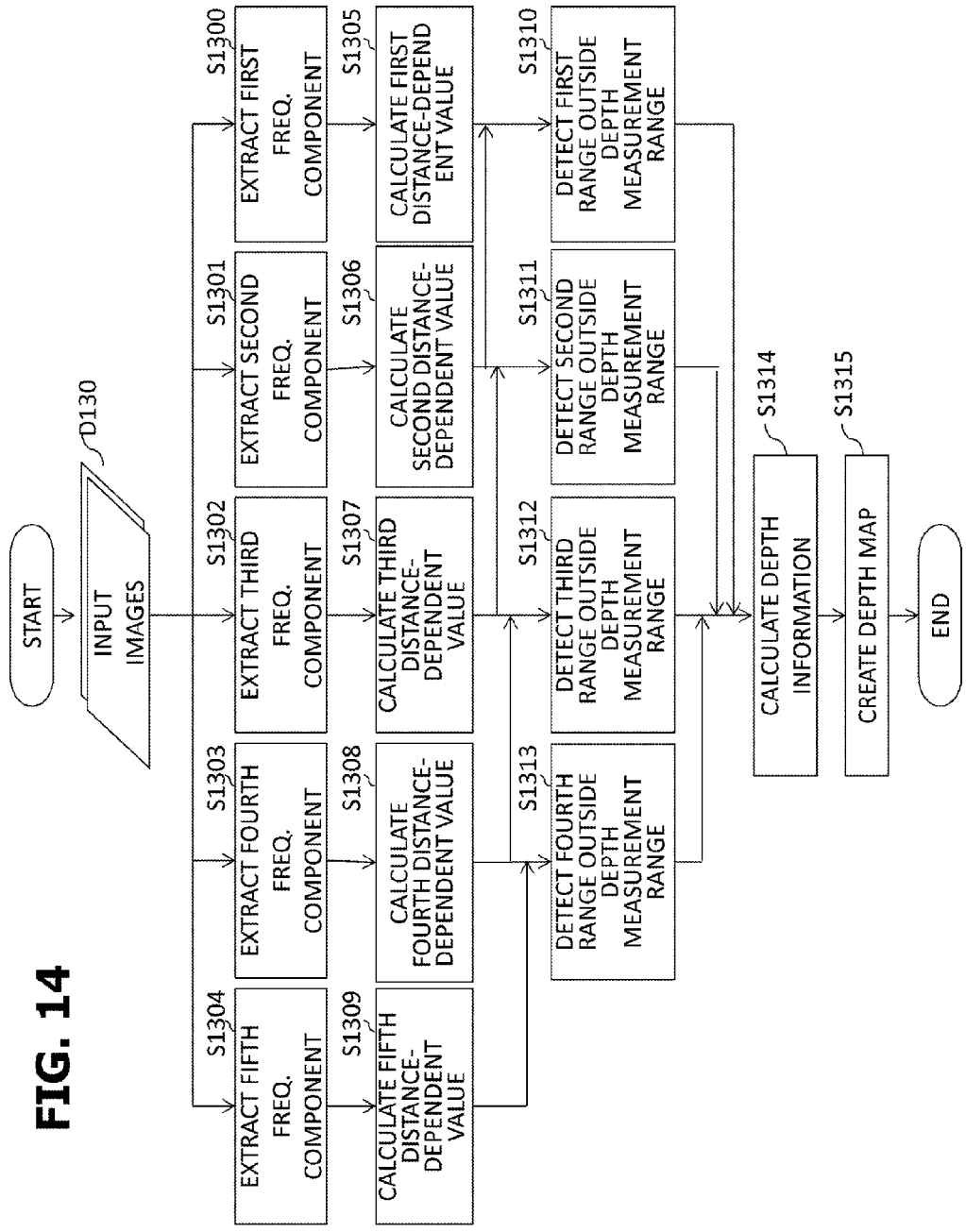
FIG. 14 is the flowchart of the depth detection method according to Example 3.

FIG. 14 shows a flowchart of depth calculation processing implemented by the imaging apparatus of the present example. A depth information calculation method using a plurality of depth-dependent values in the imaging apparatus of the present example will be explained below with reference to FIG. 14.

Input images (data D130) are a focused image and a defocused image which are two captured images with different blur that have been captured by the imaging apparatus 1 by the focus bracket method. The depth calculation unit 133 acquires the captured focused image and defocused image.

In a first frequency component extraction step (step S1300), the frequency component extraction unit 132 extracts the first frequency component, which is a high frequency component, from both the focused image and the defocused image. In a second frequency component extraction step (step S1301), the second frequency component, which is lower in frequency than the first frequency component, is extracted from both the focused image and the defocused image. In a third frequency component extraction step (step S1302), the third frequency component, which is lower in frequency than the second frequency component, is extracted from both the focused image and the defocused image. In a fourth frequency component extraction step (step S1303), the fourth frequency component, which is lower in frequency than the third frequency component, is extracted from both the focused image and the defocused image. In a fifth frequency component extraction step (step S1304), the fifth frequency component, which is lower in frequency than the fourth frequency component, is extracted from both the focused image and the defocused image.

Then, in a first depth-dependent value calculation step (step S1305), the first depth-dependent value calculation unit 1331 acquires the first depth-dependent value by the DFD method from the difference in blur between the first frequency component of the focused image and the first frequency component of the defocused image. In a second depth-dependent value calculation step (step S1306), the second depth-dependent value calculation unit 1332 acquires the second depth-dependent value by the DFD method from the difference in blur between the second frequency component of the focused image and the second frequency component of the defocused image. In a third depth-dependent value calculation step (step S1307), the third depth-dependent value calculation unit 1335 acquires the third depth-dependent value by the DFD method from the difference in blur between the third frequency component of the focused image and the third frequency component of the defocused image. In a fourth depth-dependent value calculation step (step S1308), the fourth depth-dependent value calculation unit 1336 acquires the fourth depth-dependent value by the DFD method from the difference in blur between the fourth frequency component of the focused image and the fourth frequency component of the defocused image. In a fifth depth-dependent value calculation step (step S1309), the fifth depth-dependent value calculation unit 1337 acquires the fifth depth-dependent value by the DFD method from the difference in blur between the fifth frequency component of the focused image and the fifth frequency component of the defocused image.

In a first step for detecting a range outside the depth measurement range (step S1310), the unit 1334 for detecting a range outside the depth measurement range detects a range outside the depth measurement range of the first depth-dependent value on the basis of the second depth-dependent value. In a second step for detecting a range outside the depth measurement range (step S1311), the unit 1334 for detecting a range outside the depth measurement range detects a range outside the depth measurement range of the second depth-dependent value on the basis of the third depth-dependent value. In a third step for detecting a range outside the depth measurement range (step S1312), the unit 1334 for detecting a range outside the depth measurement range detects a range outside the depth measurement range of the fourth depth-dependent value on the basis of the third depth-dependent value. In a fourth step for detecting a range outside the depth measurement range (step S1313), the unit 1334 for detecting a range outside the depth measurement range detects a range outside the depth measurement range of the fourth depth-dependent value on the basis of the fifth depth-dependent value.

The depth measurement range with the i-th high frequency component can be also detected by using a depth-dependent value of a frequency component lower than the (i+1)-th high frequency component. Therefore, the depth measurement range of the i-th high frequency component may be detected on the basis of the depth-dependent value of a (i+2)-th high or higher frequency. However, as mentioned hereinabove, the merit of using the frequency component which is a step lower (the frequency component which is the closest to the frequency component for depth measurements, among the frequency components lower than the frequency component for depth measurements) when detecting a range outside the depth measurement range is that this frequency component is close in depth resolution to the frequency component for depth measurement, and therefore the range outside the depth measurement range can be detected with high accuracy.

In a depth information calculation step (step S1314), the depth information calculation unit 1333 converts the depth-dependent values, for example, into depth information represented by a common index such as a defocus position, links together the depth information in the depth measurement range of the depth-dependent values and calculates final depth information.

In a depth map creation step (step S1315), depth information on pixels or small areas is collected and a depth map is created. The depth map is also adjusted by using correction of depth information or filling in blanks therein.

(Merits of the Present Example)

Thus, in the imaging apparatus of the present embodiment, depth-dependent values are calculated using a plurality of frequency components and final depth information is calculated from the depth-dependent values. The resultant merit is that the depth measurement range can be expanded while maintaining a high depth resolution of depth measurements. Further, the original images are two captured images with different blur, such an approach being the same as in the conventional DFD method. Thus, a significant merit is that when the depth measurement range is expanded, it is not necessary to capture a new image and no extra time is needed.

In the present example, depth information is calculated using five different frequency components, but such a procedure is not limiting, and depth information may be also determined from depth-dependent values of any number of frequency components. For example, when depth-dependent values of n frequency components (n is integer equal to or greater than 2) are used, whether or not depth measurements can be performed on the basis of the i-th (i is integer from 1 to n−1) high frequency component can be determined on the basis of the depth-dependent value corresponding to the (i+1)-th high frequency component. The depth measurement range with the i-th high frequency component may be also determined, as necessary, on the basis of the i-th depth-dependent value in addition to the (i+1)-th depth-dependent value. Further, the final depth information may be also determined from the depth-dependent value of the highest frequency component among the frequency components with which depth measurements are possible. In this case, the depth measurement range can be expanded with the increase in the number of the frequency components used (the abovementioned n value).

Other Examples

In the abovementioned examples, the imaging apparatus that captures two images and calculates a depth map is explained by way of example, but in accordance with the present invention, it is not necessary that the two images be acquired by image capturing. Thus, in an example of the present invention, a depth calculation device is used by which two captured images with different blur that are captured using different image capturing parameters are acquired from a recording medium or via a network, and the depth map is calculated from the acquired captured images. Such a depth calculation device can be configured by removing the image capturing system or the image formation circuit from the imaging apparatus according to Example 1 and adding a data reading device or network interface.

Specific installation on the above-mentioned device can be performed by software (program) or hardware. For example, various types of processing required to attain the objective of the present invention may be realized by storing a program in a memory of a computer (microcomputer, CPU, MPU, FPGA, or the like) incorporated in the imaging apparatus or image processing device and executing the program on the computer. It is preferred that a dedicated processor such as ASIC be provided for realizing the entire processing in accordance with the present invention or part thereof with logical circuits.

Further, for example, the present invention can be also implemented by a method constituted by steps executable by the computer of a system or device that realizes the functions of the aforementioned embodiments by reading and executing a program recorded in a storage device. For this purpose, the computer is provided with the program, for example, via a network or from a recording media of various types suitable for the storage device (in other words, recording media readable by the computer that non-temporarily stores data). Therefore, the abovementioned computer (including a device such as a CPU and a MPU), program (including a program code and a program product), and a computer-readable recording medium non-temporarily storing the program are all also included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-165119, filed on Aug. 8, 2013, which is hereby incorporated by reference herein in its entirety.

What is claimed is:

1. A depth calculation device for calculating depth information on an object from a captured first image and second image with different blur, the depth calculation device comprising:

an extraction unit configured to extract a first frequency component and a second frequency component from each of the first image and the second image, the first frequency component being a component of a first frequency band, the second frequency component being a component of a second frequency band, the second frequency band being lower than the first frequency band; and a depth calculation unit configured to calculate the depth information from the frequency components extracted by the extraction unit, wherein the depth calculation unit includes:

a first depth-dependent value calculation unit configured to calculate a first depth-dependent value from a difference in blur between the first frequency component of the first image and the first frequency component of the second image;

a second depth-dependent value calculation unit configured to calculate a second depth-dependent value from a difference in blur between the second frequency component of the first image and the second frequency component of the second image; and a depth information calculation unit configured to calculate the depth information on the basis of the first depth-dependent value and the second depth-dependent value.

2. The depth calculation device according to claim 1, wherein the depth calculation unit further includes a determination unit configured to determine whether or not depth measurements can be performed with respect to each region included in the first image on the basis of the first frequency component according to whether or not the second depth-dependent value of the respective region is within a predetermined range, and wherein the depth information calculation unit is further configured to take the depth information on a region, for which depth measurements based on the first frequency component are determined to be impossible, as a value indicating a range outside the depth measurement range.

3. The depth calculation device according to claim 1, wherein the depth calculation unit further includes a determination unit configured to determine whether or not depth measurements can be performed with respect to each region included in the first image on the basis of the first frequency component according to whether or not the second depth-dependent value of the respective region is within a predetermined range, and wherein the depth information calculation unit is further configured to calculate the depth information from the first depth-dependent value or from the first depth-dependent value and the second depth-dependent value in a region in which depth measurements based on the first frequency component are determined to be possible, and to calculate the depth information from the second depth-dependent value in a region in which depth measurements based on the first frequency component are determined to be impossible.

4. The depth calculation device according to claim 2, wherein
the determination unit is further configured to determine whether or not depth measurements based on the first frequency component are possible in a region by taking into account a magnitude relationship between the first depth-dependent value and the second depth-dependent value of the region.

5. The depth calculation device according to claim 1, wherein
the depth information calculation unit is further configured to calculate as final depth information an average value obtained from depth information determined from the first depth-dependent value and depth information determined from the second depth-dependent value.

6. The depth calculation device according to claim 1, wherein the depth information calculation unit is further configured to calculate the depth information from an average value obtained by weighting depth information determined from the first depth-dependent value and depth information determined from the second depth-dependent value with weights corresponding to confidence coefficients of the first depth-dependent value and the second depth-dependent value,
wherein the confidence coefficient of the first depth-dependent value is determined on the basis of a sum total of amplitudes of the first frequency components, and a first frequency band, and
wherein the confidence coefficient of the second depth-dependent value is determined on the basis of a sum total of amplitudes of the second frequency components, and a second frequency band.

7. The depth calculation device according to claim 1, wherein the first depth-dependent value calculation unit is further configured to calculate the first depth-dependent value by taking into account a magnitude relationship between the first frequency component extracted from the first image and the first frequency component extracted from the second image, and
wherein the second depth-dependent value calculation unit is configured to calculate the second depth-dependent value by taking into account a magnitude relationship between the second frequency component extracted from the first image and the second frequency component extracted from the second image.

8. A depth calculation device that calculates depth information on an object from a captured first image and second image with different blur, the depth calculation device comprising:
an extraction unit configured to extract frequency components of n frequency bands from each of the first image and the second image, wherein n is an integer equal or greater than 2; and
a depth calculation unit configured to calculate the depth information from the frequency components extracted by the extraction unit, wherein the depth calculation unit includes:
a depth-dependent value calculation unit configured to calculate a depth-dependent value with respect to each of the n frequency components on the basis of the frequency components extracted from the first image and the second image;
a determination unit configured to determine whether or not depth measurements can be performed with respect to each region included in the first image on the basis of an i-th high frequency component, wherein i is the integer from 1 to n−1, the determination being made from a depth-dependent value corresponding to an (i+1)-th high frequency component of the respective region; and
a depth information calculation unit configured to calculate the depth information with respect to each region included in the first image on the basis of the depth-dependent value corresponding to the highest frequency component among the frequency components with which depth measurements for the regions are possible.

9. The depth calculation device according to claim 8, wherein
the determination unit is configured to determine whether or not depth measurements can be performed on the basis of the i-th high frequency component according to whether or not the depth-dependent value corresponding to the (i+1)-th high frequency component is within a predetermined range.

10. The depth calculation device according to claim 9, wherein
the determination unit is further configured to determine whether or not depth measurements can be performed on the basis of the i-th high frequency component by also taking into account a relationship between the depth-dependent value corresponding to the i-th high frequency component and the depth-dependent value corresponding to the (i+1)-th high frequency component.

11. The depth calculation device according to claim 8, wherein
the depth information calculation unit is further configured to take depth information on a region, for which the determination unit has determined that depth measurements based on the (n−1)-th high frequency component are impossible, as a value indicating a range outside the depth measurement range.

12. An imaging apparatus comprising:
an image capturing unit; and
the depth calculation device according to claim 1, wherein the depth calculation device is configured to calculate depth information on an object from a plurality of images with different blur that have been captured using different image capturing parameters by means of the image capturing unit.

13. A depth calculation method for calculating depth information on an object from a captured first image and second image with different blur, the depth calculation method comprising:
an extraction step for extracting a first frequency component and a second frequency component from each of the first image and the second image, the first frequency component being a component of a first frequency band, the second frequency component being a component of a second frequency band, the second frequency band being lower than the first frequency band; and
a depth calculation step for calculating the depth information from the frequency components extracted in the extraction step, wherein the depth calculation step includes:
a first depth-dependent value calculation step for calculating a first depth-dependent value from a difference in blur between the first frequency component of the first image and the first frequency component of the second image;

a second depth-dependent value calculation step for calculating a second depth-dependent value from a difference in blur between the second frequency component of the first image and the second frequency component of the second image; and a depth information calculation step for calculating the depth information on the basis of the first depth-dependent value and the second depth-dependent value.

14. The depth calculation method according to claim 13, wherein the depth calculation step further includes a determination step for determining whether or not depth measurements can be performed with respect to each region included in the first image on the basis of the first frequency component, according to whether or not the second depth-dependent value of the respective region is within a predetermined range, and wherein in the depth information calculation step, the depth information on a region, for which depth measurements based on the first frequency component are determined to be impossible, is taken as a value indicating a range outside the depth measurement range.

15. The depth calculation method according to claim 13, wherein the depth calculation step further includes a determination step for determining whether or not depth measurements can be performed with respect to each region included in the first image on the basis of the first frequency component according to whether or not the second depth-dependent value of the respective region is within a predetermined range, and wherein in the depth information calculation step, the depth information is calculated from the first depth-dependent value or from the first depth-dependent value and the second depth-dependent value in a region in which depth measurements based on the first frequency component are determined to be possible, and the depth information is calculated from the second depth-dependent value in a region in which depth measurements based on the first frequency component are determined to be impossible.

16. The depth calculation method according to claim 14, wherein in the determination step, whether or not depth measurements based on the first frequency component are possible in a region is determined by also taking into account a magnitude relationship between the first depth-dependent value and the second depth-dependent value in the region.

17. The depth calculation method according to claim 13, wherein in the depth information calculation step, an average value obtained from depth information determined from the first depth-dependent value and depth information determined from the second depth-dependent value is calculated as final depth information.

18. The depth calculation method according to claim 13, wherein in the depth information calculation step, the depth information is calculated from an average value obtained by weighting depth information determined from the first depth-dependent value and depth information determined from the second depth-dependent value with weights corresponding to confidence coefficients of the first depth-dependent value and the second depth-dependent value, wherein the confidence coefficient of the first depth-dependent value is determined on the basis of a sum total of amplitudes of the first frequency components, and a first frequency band, and wherein the confidence coefficient of the second depth-dependent value is determined on the basis of a sum total of amplitudes of the second frequency components, and a second frequency band.

19. The depth calculation method according to claim 13, wherein in the first depth-dependent value calculation step, the first depth-dependent value is calculated by taking into account a magnitude relationship between the first frequency component extracted from the first image and the first frequency component extracted from the second image, and wherein in the second depth-dependent value calculation step, the second depth-dependent value is calculated by taking into account a magnitude relationship between the second frequency component extracted from the first image and the second frequency component extracted from the second image.

* * * * *